United States Patent
Yang et al.

(10) Patent No.: US 11,901,813 B2
(45) Date of Patent: Feb. 13, 2024

(54) SYSTEMS AND METHODS FOR VALLEY LOCKING RELATED TO QUASI-RESONANT SWITCHING POWER SUPPLIES

(71) Applicant: ON-BRIGHT ELECTRONICS (SHANGHAI) CO., LTD., Shanghai (CN)

(72) Inventors: Penglin Yang, Shanghai (CN); Yuan Lin, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/562,805

(22) Filed: Dec. 27, 2021

(65) Prior Publication Data

US 2022/0209656 A1 Jun. 30, 2022

(30) Foreign Application Priority Data

Dec. 28, 2020 (CN) .......................... 202011576478.0

(51) Int. Cl.
*H02M 3/335* (2006.01)
*H02M 3/00* (2006.01)
*H02M 1/00* (2006.01)

(52) U.S. Cl.
CPC ........... *H02M 3/01* (2021.05); *H02M 1/0003* (2021.05); *H02M 3/335* (2013.01); *H02M 3/33507* (2013.01)

(58) Field of Classification Search
CPC ............. H02M 1/0003; H02M 1/0025; H02M 1/0035; H02M 1/44; H02M 3/335; H02M 3/33507
See application file for complete search history.

(56) References Cited

U.S. PATENT DOCUMENTS 9,209,696 B1 * 12/2015 Shen ................. H02M 3/33507
9,564,811 B2 2/2017 Zhai et al.
(Continued)

FOREIGN PATENT DOCUMENTS

CN 101826796 A 9/2010
CN 102136810 A 7/2011
(Continued)

OTHER PUBLICATIONS

China Intellectual Property Office, Office Action dated Oct. 21, 2021, for Application No. 202011576478.0.
(Continued)

*Primary Examiner* — Gary L Laxton
(74) *Attorney, Agent, or Firm* — Faegre Drinker Biddle & Reath LLP

(57) ABSTRACT

Controller and method for a quasi-resonant switching power supply. For example, a controller for a quasi-resonant switching power supply includes: a valley detector configured to receive a voltage signal, detect one or more voltage valleys of the voltage signal in magnitude, and generate a detection signal representing the detected one or more voltage valleys; a valley-locking controller configured to receive one or more signals, generate a mode control signal that indicates a selected valley-locking mode based at least in part on the one or more signals, select from the detected one or more voltage valleys, one or more valleys that correspond to the selected valley-locking mode, and generate a valley control signal indicating the one or more selected valleys; and a gate driver configured to generate a drive signal based on at least information associated with the valley control signal.

22 Claims, 17 Drawing Sheets

(56) References Cited

U.S. PATENT DOCUMENTS

| | | | |
|---|---|---|---|
| 9,774,264 | B2 | 9/2017 | Yang et al. |
| 2013/0329465 | A1 | 12/2013 | Hou et al. |
| 2015/0303787 | A1 | 10/2015 | Zhai et al. |
| 2018/0076721 | A1 | 3/2018 | Cannenterre et al. |
| 2022/0006392 | A1* | 1/2022 | Chen .................... H02M 1/083 |

FOREIGN PATENT DOCUMENTS

| | | |
|---|---|---|
| CN | 103078489 A | 5/2013 |
| CN | 104348352 A | 2/2015 |
| CN | 105071662 A | 11/2015 |
| CN | 105262333 A | 1/2016 |
| CN | 105262333 B | 11/2017 |
| CN | 105099207 B | 12/2017 |
| CN | 108173435 A | 6/2018 |
| CN | 108347173 A | 7/2018 |
| CN | 207910684 U | 9/2018 |
| CN | 106849675 B | 7/2019 |
| CN | 108347173 B | 12/2019 |
| CN | 109067213 B | 12/2019 |
| JP | 5920076 B2 | 5/2016 |
| TW | I563786 B | 12/2016 |

OTHER PUBLICATIONS

Guo et al., "Design of Valley Detection Circuitover a Full Load Range," Microelectronics & Computer, vol. 32, No. 2, pp. 115-118, Feb. 2015.

Park et al., "Quasi-Resonant (QR) Controller with Adaptive Switching Frequency Reduction Scheme for Flyback Converter," IEEE Transactions on Industrial Electronics, vol. 63, No. 6, Jun. 2016.

Taiwan Patent Office, Office Action dated Aug. 20, 2021, for Application No. 110106172.

* cited by examiner

SYSTEMS AND METHODS FOR VALLEY LOCKING RELATED TO QUASI-RESONANT SWITCHING POWER SUPPLIES

1. CROSS-REFERENCES TO RELATED APPLICATIONS

This application claims priority to Chinese Patent Application No. 202011576478.0, filed Dec. 28, 2020, incorporated by reference herein for all purposes.

2. BACKGROUND OF THE INVENTION

Certain embodiments of the present invention are directed to circuits. More particularly, some embodiments of the invention provide systems and methods for valley locking. Merely by way of example, some embodiments of the invention have been applied to quasi-resonant switching power supplies. But it would be recognized that the invention has a much broader range of applicability.

With the increasing demand for switching power supplies with small size, high frequency and high power density, quasi-resonant switching power supplies that provide zero-voltage switching and/or low-voltage switching have become more and more popular. As an example, a quasi-resonant switching power supply is a quasi-resonant flyback switching power supply. FIG. 1 is a simplified diagram showing a conventional quasi-resonant switching power supply. The quasi-resonant switching power supply 100 includes a transformer 110, a transistor 120, and a quasi-resonant controller 140. In some examples, the transformer 110 includes a primary winding 112 (e.g., $L_p$), a secondary winding 114, and an auxiliary winding 116. For example, the auxiliary winding 116 includes a terminal 118. In certain examples, the transistor 120 includes a drain terminal 122, a gate terminal 124, and a source terminal 126. For example, the quasi-resonant controller 140 sends a drive signal 142 to the gate terminal 124 to turn on or turn off the transistor 120. As an example, the transistor 120 is a MOSFET transistor, a BJT-NPN transistor, an IGBT transistor, and/or a GaN transistor.

As shown in FIG. 1, the transformer 110 also includes a parasitic leakage inductor 130 (e.g., $L_{leak}$), and the transistor 120 (e.g., $S_1$) includes a parasitic capacitor 132 (e.g., $C_p$) between the drain terminal 122 and the source terminal 126 of the transistor 120. The quasi-resonant switching power supply 100 uses the primary winding 112 (e.g., $L_p$) and the parasitic capacitor 132 (e.g., $C_p$) to form an LC resonant cavity.

When the transistor 120 (e.g., $S_1$) is turned on, a current 150 (e.g., $I_p$) flows from the primary winding 112 through the transistor 120. After the transistor 120 (e.g., $S_1$) is turned off, the terminal 118 of the auxiliary winding 116 is used to detect the voltage (e.g., $V_{DEM}$) of the auxiliary winding 116. When the demagnetization process of the primary winding 112 (e.g., $L_p$) is completed, the voltage (e.g., $V_{DEM}$) drops to a low magnitude, and the primary winding 112 (e.g., $L_p$) and the parasitic capacitor 132 (e.g., $C_p$) undergo free oscillation. During the free oscillation, the voltage difference from the drain terminal 122 to the source terminal 126 drops to one or more valleys. At one valley (e.g., at the $1^{st}$ valley) of the one or more valleys, the quasi-resonant controller 140 generates the drive signal 142 to turn on the transistor 120 (e.g., $S_1$) to start another switching cycle. The quasi-resonant switching power supply 100 often can significantly reduce the switching loss and the radiation electromagnetic interference (EMI).

FIG. 2 shows a simplified timing diagram for the conventional quasi-resonant switching power supply 100 as shown in FIG. 1. The waveform 210 represents the voltage difference (e.g., $V_{ds}$) from the drain terminal 122 to the source terminal 126 as a function of time, the waveform 220 represents the drive signal 142 at the gate terminal 124 as a function of time, and the waveform 230 represents the current 150 as a function of time.

At time $t_0$, the drive signal 142 at the gate terminal 124 changes from a logic low level to a logic high level as shown by the waveform 220 and the transistor 120 becomes turned on. From time $t_0$ to time $t_1$, the drive signal 142 at the gate terminal 124 remains at the logic high level as shown by the waveform 220, the transistor 120 remains turned on, and the current 150 increases from zero to a peak magnitude 232 (e.g., $I_{pk}$) as shown by the waveform 230. At time $t_1$, the drive signal 142 at the gate terminal 124 changes from the logic high level to the logic low level as shown by the waveform 220, the transistor 120 becomes turned off, and the current 150 drops from the peak magnitude 232 (e.g., $I_{pk}$) to zero as shown by the waveform 230.

From time $t_1$ to time $t_3$ through time $t_2$, the drive signal 142 at the gate terminal 124 remains at the logic low level as shown by the waveform 220, the transistor 120 remains turned off, and the current 150 remains equal to zero as shown by the waveform 230. As an example, from time $t_1$ to time $t_2$, the primary winding 112 (e.g., $L_p$) undergoes the demagnetization process as shown by the waveform 210. At time $t_2$, the demagnetization process of the primary winding 112 (e.g., $L_p$) ends, and the free oscillation of the primary winding 112 (e.g., $L_p$) and the parasitic capacitor 132 (e.g., $C_p$) starts. From time $t_2$ to time $t_3$, the primary winding 112 (e.g., $L_p$) and the parasitic capacitor 132 (e.g., $C_p$) undergo free oscillation as shown by the waveform 210. At time $t_3$, the voltage difference from the drain terminal 122 to the source terminal 126 drops to a $1^{st}$ valley as shown by the waveform 210, the drive signal 142 at the gate terminal 124 changes from the logic high level to the logic low level as shown by the waveform 220, and the transistor 120 becomes turned on.

As shown in FIG. 2, the time duration from time $t_0$ to time $t_3$ corresponds to a switching cycle, which includes an on-time period and an off-time period. The on-time period (e.g., $T_{on}$) starts at time $t_0$ and ends at time $t_1$, and the off-time period (e.g., $T_{off}$) starts at time $t_1$ and ends at time $t_3$. At time $t_3$, when the voltage difference from the drain terminal 122 to the source terminal 126 reaches the $1^{st}$ valley, another switching cycle starts. The quasi-resonant switching power supply 100 starts a switching cycle at the $1^{st}$ valley of the voltage difference from the drain terminal 122 to the source terminal 126, and the quasi-resonant switching power supply 100, as an example, operates in the critical conduction mode. As shown by the waveform 210, each resonance period for the free oscillation of the primary winding 112 (e.g., $L_p$) and the parasitic capacitor 132 (e.g., $C_p$) is smaller than a switching cycle.

For example, during the free oscillation, the voltage difference from the drain terminal 122 to the source terminal 126 drops to one or more valleys. At one valley (e.g., at the $n^{th}$ valley with n being a positive integer) of the one or more valleys, the quasi-resonant controller 140 generates the drive signal 142 to turn on the transistor 120 (e.g., $S_1$) to start another switching cycle. As an example, the quasi-resonant switching power supply 100 starts a switching cycle at the $n^{th}$ valley of the voltage difference from the drain terminal 122 to the source terminal 126, and the quasi-resonant switching power supply 100 operates in the valley switching mode, wherein n is an integer equal to or larger than one.

The operation frequency of a conventional quasi-resonant switching power supply (e.g., the quasi-resonant switching power supply 100) often needs to fall within a predetermined range between an upper frequency limit and a lower frequency limit. For example, the operation frequency of the quasi-resonant switching power supply 100 is equal to one divided by one switching cycle of the quasi-resonant switching power supply 100. As an example, one switching cycle of the quasi-resonant switching power supply 100 is equal to a sum of an on-time period (e.g., $T_{on}$) and an off-time period (e.g., $T_{off}$) in duration as shown in FIG. 2.

Often, the conventional quasi-resonant switching power supply (e.g., the quasi-resonant switching power supply 100) uses frequency jittering. For example, if the operation frequency of the conventional quasi-resonant switching power supply, without any frequency jittering, is close to the upper frequency limit or the lower frequency limit, the operation frequency superimposed with frequency jittering rises above the upper frequency limit or falls below the lower frequency limit, causing the conventional quasi-resonant switching power supply (e.g., the quasi-resonant switching power supply 100) to change randomly between starting a switching cycle at the $n^{th}$ valley and starting a switching cycle at the $v^{th}$ valley, wherein n and v each are a positive integer but n and v are not equal. As an example, for the conventional quasi-resonant switching power supply (e.g., the quasi-resonant switching power supply 100), the valley at which a switching cycle starts bounces randomly between two adjacent valleys (e.g., randomly between the $n^{th}$ valley and the $(n+1)^{th}$ valley) or bounces randomly among multiple valleys at an irregular low frequency. The envelope frequency of such random bounces between two adjacent valleys or among multiple valleys often is lower than 20 KHz within the audio range, causing the noise performance of the conventional quasi-resonant switching power supply (e.g., the quasi-resonant switching power supply 100) to greatly deteriorate.

To improve the noise performance (e.g., to reduce abnormal noise), a conventional quasi-resonant switching power supply is provided with a valley locking mechanism. FIG. 3 is a simplified diagram showing a conventional quasi-resonant switching power supply with a valley locking mechanism. The quasi-resonant switching power supply 300 includes a transformer 310, a transistor 320, a quasi-resonant controller 340, an error amplification and isolation component 370, a diode 380, capacitors 378 and 382, resistors 384, 386 and 388. In some examples, the transformer 310 includes a primary winding 312 (e.g., $L_p$), a secondary winding 314, and an auxiliary winding 316. For example, the auxiliary winding 316 includes a terminal 318. In certain examples, the transistor 320 includes a drain terminal 322, a gate terminal 324, and a source terminal 326. As an example, the drain terminal 322 of the transistor 320 is connected to the primary winding 312 (e.g., $L_p$). For example, the quasi-resonant controller 340 sends a drive signal 352 to the gate terminal 324 to turn on or turn off the transistor 320. As an example, the transistor 320 (e.g., $Q_1$) includes a parasitic capacitor 332 (e.g., $C_p$) between the drain terminal 322 and the source terminal 326 of the transistor 320. For example, the transistor 320 is a MOSFET transistor, a BJT-NPN transistor, an IGBT transistor, and/or a GaN transistor.

As shown in FIG. 3, the quasi-resonant controller 340 includes a terminal 342 (e.g., GATE), a terminal 344 (e.g., CS), a terminal 346 (e.g., DEM), and a terminal 348 (e.g., FB). For example, the quasi-resonant controller 340 includes a diode 372 (e.g., $D_2$), a resistor 374 (e.g., $R_1$), a resistor 376 (e.g., $R_2$), a comparator 360, a flip-flop 362, a gate driver 364, a valley detector 366, and a valley locking controller 368. As an example, the terminal 342 (e.g., GATE) outputs the drive signal 352, the terminal 344 (e.g., CS) receives a signal 354 (e.g., $V_{CS}$) from the resistor 388 (e.g., $R_{sense}$), the terminal 346 (e.g., DEM) receives a signal 356 from the resistors 384 and 386, and the terminal 348 (e.g., FB) receives a signal 358 from the error amplification and isolation component 370. The quasi-resonant switching power supply 300 supplies an output power (e.g., $P_{out}$) to an output load by providing an output voltage 392 (e.g., $V_o$) and an output current 394 (e.g., $I_o$).

When the transistor 320 (e.g., $Q_1$) is turned on, a current 350 (e.g., $I_p$) flows from the primary winding 312 through the transistor 320, an input voltage 390 (e.g., $V_{in}$) charges the primary winding 312, the diode 380 (e.g., $D_1$) is turned off, the capacitor 382 (e.g., $C_1$) supplies the output power (e.g., $P_{out}$) to the output load by providing the output voltage 392 (e.g., $V_o$) and the output current 394 (e.g., $I_o$), and the output voltage 392 (e.g., $V_o$) is fed back as the signal 358 to the quasi-resonant controller 340 by the error amplification and isolation component 370. The signal 358 is received by the diode 372 (e.g., $D_2$) and becomes a signal 373 (e.g., $V_{FB\_in}$). The signal 373 (e.g., $V_{FB\_in}$) is processed by a voltage divider that includes the resistor 374 (e.g., $R_1$) and the resistor 376 (e.g., $R_2$). The voltage divider outputs a signal 375 to the comparator 360, which also receives the signal 354 (e.g., $V_{CS}$) and generates a signal 361. The signal 375 represents the output voltage 392 (e.g., $V_o$) of the quasi-resonant switching power supply 300, even if the signal 375 is not equal to the output voltage 392 (e.g., $V_o$). The signal 361 is received by the flip-flop 362 that is coupled to the gate driver 364, and the signal 361 is used to control the switching frequency and the duty cycle of the drive signal 352 in order to keep the output voltage 392 (e.g., $V_o$) constant.

When the transistor 320 (e.g., $Q_1$) is turned off, the primary winding 312 undergoes a demagnetization process, the diode 380 (e.g., $D_1$) is turned on, and the secondary winding 314 charges the capacitor 382 (e.g., $C_1$) and also supplies power to the output load. After the demagnetization process of the primary winding 312 is completed, the primary winding 312 (e.g., $L_p$) and the parasitic capacitor 332 (e.g., $C_p$) starts free oscillation. During the free oscillation, the resonance period is determined as follows:

$$T_q = 2\pi\sqrt{L_p \times C_p} \qquad \text{(Equation 1)}$$

wherein $T_q$ represents the resonance period for the free oscillation of the primary winding 312 and the parasitic capacitor 332. Additionally, $L_p$ represents the inductance of the primary winding 312, and $C_p$ represents the capacitance of the parasitic capacitor 332.

As shown in FIG. 3, the voltage at the terminal 318 of the auxiliary winding 316 is processed by a voltage divider that includes the resistors 384 and 386. One terminal of the resistor 384 is connected to the auxiliary winding 316 coupled to the primary winding 312 (e.g., $L_p$) and the secondary winding 314. The voltage divider outputs the signal 356 to the valley detector 366, which in response generates a signal 367, which includes one or more pulses that represent one or more valleys of the voltage difference from the drain terminal 322 to the source terminal 326. The signal 367 is received by the valley locking controller 368, which selects one pulse from the one or more pulses to start a switching cycle. The decision about which one pulse is selected from the one or more pulses is made by the valley locking controller 368 based at least in part on the signal 375 and/or the drive signal 352. The signal 375 and/or the drive signal 352 are also received by the valley locking controller 368. As an example, the signal 375, which represents the magnitude of the signal 373 (e.g., $V_{FB\_in}$), is used to make the decision by the valley locking controller 368. For example, the switching frequency of the drive signal 352 is used to make the decision by the valley locking controller 368.

The valley locking controller 368 receives the signal 367, the signal 375 and/or the drive signal 352 and generates a signal 353 that represents the selected pulse to start a switching cycle. The flip-flop 362 includes an input terminal 396 (e.g., S), an input terminal 398 (e.g., R), and an output terminal 338 (e.g., Q). The signal 353 is received by the input terminal 396 (e.g., S) of the flip-flop 362, and the signal 361 is received by the input terminal 398 (e.g., R) of the flip-flop 362. As an example, the signal 363 is outputted by the output terminal 338 (e.g., Q) of the flip-flop 362 and is received by the gate driver 364. The gate driver 364 generates the drive signal 352 based at least in part on the signal 363 and sends the drive signal 352 to the gate terminal 324 of the transistor 320 through the terminal 342 (e.g., GATE) of the quasi-resonant controller 340. When the drive signal 352 changes from one logic level (e.g., a logic low level) to another logic level (e.g., the logic high level), the transistor 320 is turned on.

FIG. 4 shows a simplified diagram for the conventional quasi-resonant switching power supply 300 with a valley locking mechanism as shown in FIG. 3. The waveform 410 represents the switching frequency as a function of the output power (e.g., $P_{out}$) when the output power (e.g., $P_{out}$) of the quasi-resonant switching power supply 300 decreases, and the waveform 420 represents the switching frequency as a function of the output power (e.g., $P_{out}$) when the output power (e.g., $P_{out}$) of the quasi-resonant switching power supply 300 increases.

As shown by the waveform 410, power level $P_0$ is larger than power level $P_{a1}$, the power level $P_{a1}$ is larger than power level $P_{a2}$, the power level $P_{a2}$ is larger than power level $P_{a3}$, the power level $P_{a3}$ is larger than power level $P_{a4}$, the power level $P_{a4}$ is larger than power level $P_{a5}$, the power level $P_{a5}$ is larger than power level $P_{a6}$, and the power level $P_{a6}$ is larger than power level $P_{an}$. When the output power (e.g., $P_{out}$) decreases from the power level $P_0$ to the power level $P_{a1}$, for all switching cycles, the valley of the voltage difference from the drain terminal 322 to the source terminal 326 at which a switching cycle starts is locked at the $1^{st}$ valley. At the power level $P_{a1}$, the valley of the voltage difference from the drain terminal 322 to the source terminal 326 at which a switching cycle starts is changed from the $1^{st}$ valley to the $2^{nd}$ valley. When the output power (e.g., $P_{out}$) decreases from the power level $P_{a1}$ to the power level $P_{a2}$, for all switching cycles, the valley of the voltage difference from the drain terminal 322 to the source terminal 326 at which a switching cycle starts is locked at the $2^{nd}$ valley. At the power level $P_{a2}$, the valley of the voltage difference from the drain terminal 322 to the source terminal 326 at which a switching cycle starts is changed from the $2^{nd}$ valley to the $3^{rd}$ valley. When the output power (e.g., $P_{out}$) decreases from the power level $P_{a2}$ to the power level $P_{a3}$, for all switching cycles, the valley of the voltage difference from the drain terminal 322 to the source terminal 326 at which a switching cycle starts is locked at the $3^{rd}$ valley. At the power level $P_{a3}$, the valley of the voltage difference from the drain terminal 322 to the source terminal 326 at which a switching cycle starts is changed from the $3^{rd}$ valley to the $4^{th}$ valley. When the output power (e.g., $P_{out}$) decreases from the power level $P_{a3}$ to the power level $P_{a4}$, for all switching cycles, the valley of the voltage difference from the drain terminal 322 to the source terminal 326 at which a switching cycle starts is locked at the $4^{th}$ valley. At the power level $P_{a4}$, the valley of the voltage difference from the drain terminal 322 to the source terminal 326 at which a switching cycle starts is changed from the $4^{th}$ valley to the $5^{th}$ valley. When the output power (e.g., $P_{out}$) decreases from the power level $P_{a4}$ to the power level $P_{a5}$, for all switching cycles, the valley of the voltage difference from the drain terminal 322 to the source terminal 326 at which a switching cycle starts is locked at the $5^{th}$ valley. At the power level $P_{a5}$, the valley of the voltage difference from the drain terminal 322 to the source terminal 326 at which a switching cycle starts is changed from the $5^{th}$ valley to the $6^{th}$ valley. When the output power (e.g., $P_{out}$) decreases from the power level $P_{a5}$ to the power level $P_{a6}$, for all switching cycles, the valley of the voltage difference from the drain terminal 322 to the source terminal 326 at which a switching cycle starts is locked at the $6^{th}$ valley.

As shown by the waveform 420, power level $P_0$ is larger than power level $P_{b1}$, the power level $P_{b1}$ is larger than power level $P_{b2}$, the power level $P_{b2}$ is larger than power level $P_{b3}$, the power level $P_{b3}$ is larger than power level $P_{b4}$, the power level $P_{b4}$ is larger than power level $P_{b5}$, the power level $P_{b5}$ is larger than power level $P_{b6}$, and the power level $P_{b6}$ is larger than power level $P_{bn}$. When the output power (e.g., $P_{out}$) increases from the power level $P_{b6}$ to the power level $P_{b5}$, for all switching cycles, the valley of the voltage difference from the drain terminal 322 to the source terminal 326 at which a switching cycle starts is locked at the $6^{th}$ valley. At the power level $P_{b5}$, the valley of the voltage difference from the drain terminal 322 to the source terminal 326 at which a switching cycle starts is changed from the $6^{th}$ valley to the $5^{th}$ valley. When the output power (e.g., $P_{out}$) increases from the power level $P_{b5}$ to the power level $P_{b4}$, for all switching cycles, the valley of the voltage difference from the drain terminal 322 to the source terminal 326 at which a switching cycle starts is locked at the $5^{th}$ valley. At the power level $P_{b4}$, the valley of the voltage difference from the drain terminal 322 to the source terminal 326 at which a switching cycle starts is changed from the $5^{th}$ valley to the $4^{th}$ valley. When the output power (e.g., $P_{out}$) increases from the power level $P_{b4}$ to the power level $P_{b3}$, for all switching cycles, the valley of the voltage difference from the drain terminal 322 to the source terminal 326 at which a switching cycle starts is locked at the $4^{th}$ valley. At the power level $P_{b3}$, the valley of the voltage difference from the drain terminal 322 to the source terminal 326 at which a switching cycle starts is changed from the $4^{th}$ valley to the $3^{rd}$ valley. When the output power (e.g., $P_{out}$) increases from the power level $P_{b3}$ to the power level $P_{b2}$, for all switching cycles, the valley of the voltage difference from the drain terminal 322 to the source terminal 326 at which a switching cycle starts is locked at the $3^{rd}$ valley. At the power level $P_{b2}$, the valley of the voltage difference from the drain terminal 322 to the source terminal 326 at which a switching cycle starts is changed from the $3^{rd}$ valley to the $2^{nd}$ valley. When the output power (e.g., $P_{out}$) increases from the power level $P_{b2}$ to the power level $P_{b1}$, for all switching cycles, the valley of the voltage difference from the drain terminal 322 to the source terminal 326 at which a switching cycle starts is locked at the $2^{nd}$ valley. At the power level $P_{b1}$, the valley of the voltage difference from the drain terminal 322 to the source terminal 326 at which a switching cycle starts is changed from the $2^{nd}$ valley to the $1^{st}$ valley. When the output power (e.g., $P_{out}$) increases from the power level $P_{a1}$ to the power level $P_0$, for all switching cycles, the valley of the voltage difference from the drain terminal 322 to the source terminal 326 at which a switching cycle starts is locked at the $1^{st}$ valley.

As shown in FIG. 4, in order to improve the efficiency of the quasi-resonant switching power supply 300 when the output power (e.g., $P_{out}$) is low (e.g., when the output current 394 is small and the output voltage 392 remains constant), the valley of the voltage difference from the drain terminal 322 to the source terminal 326 at which a switching cycle starts is locked at a later valley by skipping one or more previous valleys, thus reducing the switching frequency of the quasi-resonant switching power supply 300.

FIG. 5 shows a simplified diagram for the conventional quasi-resonant switching power supply 300 with a valley locking mechanism that uses the signal 373 (e.g., $V_{FB\_in}$) as shown in FIG. 3. The waveform 510 represents the selected and locked valley as a function of the signal 373 (e.g., $V_{FB\_in}$) when the output current 394 decreases as the output voltage 392 remains constant, and the waveform 520 represents the selected and locked valley as a function of the signal 373 (e.g., $V_{FB\_in}$) when the output current 394 increases as the output voltage 392 remains constant.

As shown by the waveform 510, voltage magnitude $V_p$ is larger than voltage magnitude $V_{1-2}$, the voltage magnitude $V_{1-2}$ is larger than voltage magnitude $V_{2-3}$, the voltage magnitude $V_{2-3}$ is larger than voltage magnitude $V_{3-4}$, the voltage magnitude $V_{3-4}$ is larger than voltage magnitude $V_{4-5}$, the voltage magnitude $V_{4-5}$ is larger than voltage magnitude $V_{5-6}$, and the voltage magnitude $V_{5-6}$ is larger than voltage magnitude $V_{(n-1)-n}$. When the signal 373 (e.g., $V_{FB\_in}$) decreases from the voltage magnitude $V_p$ to the voltage magnitude $V_{1-2}$, for all switching cycles, the valley of the voltage difference from the drain terminal 322 to the source terminal 326 at which a switching cycle starts is locked at the $1^{st}$ valley. At the voltage magnitude $V_{1-2}$, the valley of the voltage difference from the drain terminal 322 to the source terminal 326 at which a switching cycle starts is changed from the $1^{st}$ valley to the $2^{nd}$ valley, and then the signal 373 (e.g., $V_{FB\_in}$) changes to a magnitude that is larger than the voltage magnitude $V_{1-2}$. When the signal 373 (e.g., $V_{FB\_in}$) decreases from the magnitude that is larger than the voltage magnitude $V_{1-2}$ to the voltage magnitude $V_{2-3}$, for all switching cycles, the valley of the voltage difference from the drain terminal 322 to the source terminal 326 at which a switching cycle starts is locked at the $2^{nd}$ valley. At the voltage magnitude $V_{2-3}$, the valley of the voltage difference from the drain terminal 322 to the source terminal 326 at which a switching cycle starts is changed from the $2^{nd}$ valley to the $3^{rd}$ valley, and then the signal 373 (e.g., $V_{FB\_in}$) changes to a magnitude that is larger than the voltage magnitude $V_{2-3}$. When the signal 373 (e.g., $V_{FB\_in}$) decreases from the magnitude that is larger than the voltage magnitude $V_{2-3}$ to the voltage magnitude $V_{3-4}$, for all switching cycles, the valley of the voltage difference from the drain terminal 322 to the source terminal 326 at which a switching cycle starts is locked at the $3^{rd}$ valley. At the voltage magnitude $V_{3-4}$, the valley of the voltage difference from the drain terminal 322 to the source terminal 326 at which a switching cycle starts is changed from the $3^{rd}$ valley to the $4^{th}$ valley, and then the signal 373 (e.g., $V_{FB\_in}$) changes to a magnitude that is larger than the voltage magnitude $V_{3-4}$.

When the signal 373 (e.g., $V_{FB\_in}$) decreases from the magnitude that is larger than the voltage magnitude $V_{3-4}$ to the voltage magnitude $V_{4-5}$, for all switching cycles, the valley of the voltage difference from the drain terminal 322 to the source terminal 326 at which a switching cycle starts is locked at the $4^{th}$ valley. At the voltage magnitude $V_{4-5}$, the valley of the voltage difference from the drain terminal 322 to the source terminal 326 at which a switching cycle starts is changed from the $4^{th}$ valley to the $5^{th}$ valley, and then the signal 373 (e.g., $V_{FB\_in}$) changes to a magnitude that is larger than the voltage magnitude $V_{4-5}$. When the signal 373 (e.g., $V_{FB\_in}$) decreases from the magnitude that is larger than the voltage magnitude $V_{4-5}$ to the voltage magnitude $V_{5-6}$, for all switching cycles, the valley of the voltage difference from the drain terminal 322 to the source terminal 326 at which a switching cycle starts is locked at the $5^{th}$ valley. At the voltage magnitude $V_{5-6}$, the valley of the voltage difference from the drain terminal 322 to the source terminal 326 at which a switching cycle starts is changed from the $5^{th}$ valley to the $6^{th}$ valley, and then the signal 373 (e.g., $V_{FB\_in}$) changes to a magnitude that is larger than the voltage magnitude $V_{5-6}$.

As shown by the waveform 520, voltage magnitude $V_p$ is larger than voltage magnitude $V_{2-1}$, the voltage magnitude $V_{2-1}$ is larger than voltage magnitude $V_{3-2}$, the voltage magnitude $V_{3-2}$ is larger than voltage magnitude $V_{4-3}$, the voltage magnitude $V_{4-3}$ is larger than voltage magnitude $V_{5-4}$, the voltage magnitude $V_{5-4}$ is larger than voltage magnitude $V_{6-5}$, and the voltage magnitude $V_{6-5}$ is larger than voltage magnitude $V_{n-(n-1)}$. At the voltage magnitude $V_{6-5}$, the valley of the voltage difference from the drain terminal 322 to the source terminal 326 at which a switching cycle starts is changed from the $6^{th}$ valley to the $5^{th}$ valley, and then the signal 373 (e.g., $V_{FB\_in}$) changes to a magnitude that is smaller than the voltage magnitude $V_{6-5}$. When the signal 373 (e.g., $V_{FB\_in}$) increases from the magnitude that is smaller than the voltage magnitude $V_{6-5}$ to the voltage magnitude $V_{5-4}$, for all switching cycles, the valley of the voltage difference from the drain terminal 322 to the source terminal 326 at which a switching cycle starts is locked at the $5^{th}$ valley. At the voltage magnitude $V_{5-4}$, the valley of the voltage difference from the drain terminal 322 to the source terminal 326 at which a switching cycle starts is changed from the $5^{th}$ valley to the $4^{th}$ valley, and then the signal 373 (e.g., $V_{FB\_in}$) changes to a magnitude that is smaller than the voltage magnitude $V_{5-4}$. When the signal 373 (e.g., $V_{FB\_in}$) increases from the magnitude that is smaller than the voltage magnitude $V_{5-4}$ to the voltage magnitude $V_{4-3}$, for all switching cycles, the valley of the voltage difference from the drain terminal 322 to the source terminal 326 at which a switching cycle starts is locked at the $4^{th}$ valley. At the voltage magnitude $V_{4-3}$, the valley of the voltage difference from the drain terminal 322 to the source terminal 326 at which a switching cycle starts is changed from the $4^{th}$ valley to the $3^{rd}$ valley, and then the signal 373 (e.g., $V_{FB\_in}$) changes to a magnitude that is smaller than the voltage magnitude $V_{4-3}$. When the signal 373 (e.g., $V_{FB\_in}$) increases from the magnitude that is smaller than the voltage magnitude $V_{4-3}$ to the voltage magnitude $V_{3-2}$, for all switching cycles, the valley of the voltage difference from the drain terminal 322 to the source terminal 326 at which a switching cycle starts is locked at the $3^{rd}$ valley. At the voltage magnitude $V_{3-2}$, the valley of the voltage difference from the drain terminal 322 to the source terminal 326 at which a switching cycle starts is changed from the $3^{rd}$ valley to the $2^{nd}$ valley, and then the signal 373 (e.g., $V_{FB\_in}$) changes to a magnitude that is smaller than the voltage magnitude $V_{3-2}$. When the signal 373 (e.g., $V_{FB\_in}$) increases from the magnitude that is smaller than the voltage magnitude $V_{3-2}$ to the voltage magnitude $V_{2-1}$, for all switching cycles, the valley of the voltage difference from the drain terminal 322 to the source terminal 326 at which a switching cycle starts is locked at the $2^{nd}$ valley. At the voltage magnitude $V_{2-1}$, the valley of the voltage difference from the drain terminal 322 to the source terminal 326 at which a switching cycle starts is changed from the $2^{nd}$ valley to the $1^{st}$ valley, and then the signal 373 (e.g., $V_{FB\_in}$) changes to a magnitude that is smaller than the voltage magnitude $V_{2-1}$. When the signal 373 (e.g., $V_{FB\_in}$) increases from the magnitude that is smaller than the voltage magnitude $V_{2-1}$ to the voltage magnitude $V_p$, for all switching cycles, the valley of the voltage difference from the drain terminal 322 to the source terminal 326 at which a switching cycle starts is locked at the $1^{st}$ valley.

As shown in FIG. 5, at the voltage magnitude $V_{1-2}$, the valley of the voltage difference from the drain terminal 322 to the source terminal 326 at which a switching cycle starts is changed from the $1^{st}$ valley to the $2^{nd}$ valley, and then the signal 373 (e.g., $V_{FB\_in}$) changes to a magnitude that is larger than the voltage magnitude $V_{1-2}$. Also, at the voltage magnitude $V_{2-1}$, the valley of the voltage difference from the drain terminal 322 to the source terminal 326 at which a switching cycle starts is changed from the $2^{nd}$ valley to the $1^{st}$ valley, and then the signal 373 (e.g., $V_{FB\_in}$) changes to a magnitude that is smaller than the voltage magnitude $V_{2-1}$. Therefore, in order to avoid the low-frequency back-and-forth bounce between the $1^{st}$ valley and the $2^{nd}$ valley, the difference between the voltage magnitude $V_{2-1}$ and the voltage magnitude $V_{1-2}$ often needs to be sufficiently large, but such design preference usually brings additional challenges to loop stability.

FIG. 6 shows a simplified diagram for the conventional quasi-resonant switching power supply 300 with a valley locking mechanism that uses the drive signal 352 as shown in FIG. 3. The waveform 610 represents the switching frequency of the drive signal 352 as a function of the signal 373 (e.g., $V_{FB\_in}$) when the output current 394 decreases as the output voltage 392 remains constant, and the waveform 620 represents the switching frequency of the drive signal 352 as a function of the signal 373 (e.g., $V_{FB\_in}$) when the output current 394 increases as the output voltage 392 remains constant.

As shown in FIG. 6, the operation frequency of the quasi-resonant switching power supply 300, which is equal to the switching frequency of the drive signal 352, needs to fall within a predetermined range between an upper frequency limit (e.g., $F_{inc}$) and a lower frequency limit (e.g., $F_{dec}$). The waveform 660 represents the upper frequency limit (e.g., $F_{inc}$) as a function of the signal 373 (e.g., $V_{FB\_in}$), and the waveform 670 represents the lower frequency limit (e.g., $F_{dec}$) as a function of the signal 373 (e.g., $V_{FB\_in}$).

When the output current 394 decreases as the output voltage 392 remains constant (e.g., when the output load of the quasi-resonant switching power supply 300 changes from high load to light load), the magnitude of the signal 373 (e.g., $V_{FB\_in}$), the on-time period of a switching cycle, and the demagnetization time of a demagnetization process also decrease. As shown by the waveform 610, if the valley at which a switching cycle starts is locked at the same valley for multiple adjacent switching cycles (e.g., locked at the $n^{th}$ valley for multiple adjacent switching cycles, where n is a positive integer), the switching frequency of the drive signal 352 increases, when the output current 394 decreases as the output voltage 392 remains constant (e.g., when the output load of the quasi-resonant switching power supply 300 changes from high load to light load). When the switching frequency of the drive signal 352 increases to the corresponding upper frequency limit (e.g., $F_{inc}$) as shown by the waveform 660, the valley of the voltage difference from the drain terminal 322 to the source terminal 326 at which a switching cycle starts is changed from the $n^{th}$ valley for all switching cycles to the $(n+1)^{th}$ valley for all switching cycles, where n is a positive integer. When the valley of the voltage difference from the drain terminal 322 to the source terminal 326 at which a switching cycle starts is changed from the $n^{th}$ valley to the $(n+1)^{th}$ valley (e.g., is changed from the $1^{st}$ valley to the $2^{nd}$ valley), the switching frequency of the drive signal 352 drops to a frequency magnitude within the predetermined range between the upper frequency limit (e.g., $F_{inc}$) and the lower frequency limit (e.g., $F_{dec}$), but the signal 373 (e.g., $V_{FB\_in}$) becomes larger.

As shown by the waveform 610, as an example, when the signal 373 (e.g., $V_{FB\_in}$) is equal to a voltage magnitude $V_{fb1}$, the switching frequency of the drive signal 352 reaches the corresponding upper frequency limit (e.g., $F_{inc}$) that is equal to a frequency magnitude $F_{s1}$, and the valley of the voltage difference from the drain terminal 322 to the source terminal 326 at which a switching cycle starts is changed from the $1^{st}$ valley for all switching cycles to the $2^{nd}$ valley for all switching cycles. When the valley of the voltage difference from the drain terminal 322 to the source terminal 326 at which a switching cycle starts is changed from the $1^{st}$ valley to the $2^{nd}$ valley, the switching frequency of the drive signal 352 drops from the frequency magnitude $F_{s1}$ to another frequency magnitude $F_{s2}$ and the signal 373 (e.g., $V_{FB\_in}$) increases from the voltage magnitude $V_{fb1}$ to another voltage magnitude $V_{fb2}$.

When the output current 394 increases as the output voltage 392 remains constant (e.g., when the output load of the quasi-resonant switching power supply 300 changes from low load to high load), the magnitude of the signal 373 (e.g., $V_{FB\_in}$), the on-time period of a switching cycle, and the demagnetization time of a demagnetization process also increase. As shown by the waveform 620, if the valley at which a switching cycle starts is locked at the same valley for multiple adjacent switching cycles (e.g., locked at the $(n+1)^{th}$ valley for multiple adjacent switching cycles, where n is a positive integer), the switching frequency of the drive signal 352 decreases, when the output current 394 increases as the output voltage 392 remains constant (e.g., when the output load of the quasi-resonant switching power supply 300 changes from light load to high load). When the switching frequency of the drive signal 352 decreases to the corresponding lower frequency limit (e.g., $F_{dec}$) as shown by the waveform 670, the valley of the voltage difference from the drain terminal 322 to the source terminal 326 at which a switching cycle starts is changed from the $(n+1)^{th}$ valley for all switching cycles to the $n^{th}$ valley for all switching cycles, where n is a positive integer. When the valley of the voltage difference from the drain terminal 322 to the source terminal 326 at which a switching cycle starts is changed from the $(n+1)^{th}$ valley to the $n^{th}$ valley (e.g., is changed from the $2^{nd}$ valley to the $1^{st}$ valley), the switching frequency of the drive signal 352 jumps to a higher frequency magnitude that falls within the predetermined range between the upper frequency limit (e.g., $F_{inc}$) and the lower frequency limit (e.g., $F_{dec}$), but the signal 373 (e.g., $V_{FB\_in}$) becomes smaller.

As shown by the waveform 620, as an example, if the switching frequency of the drive signal 352 reaches the corresponding lower frequency limit (e.g., $F_{dec}$), the valley of the voltage difference from the drain terminal 322 to the source terminal 326 at which a switching cycle starts is changed from the $2^{nd}$ valley for all switching cycles to the $1^{st}$ valley for all switching cycles. When the valley of the voltage difference from the drain terminal 322 to the source terminal 326 at which a switching cycle starts is changed from the $2^{nd}$ valley to the $1^{st}$ valley, the switching frequency of the drive signal 352 jumps higher and the signal 373 (e.g., $V_{FB\_in}$) becomes smaller.

As shown by the waveform 610, when the valley of the voltage difference from the drain terminal 322 to the source terminal 326 at which a switching cycle starts is changed from the $n^{th}$ valley to the $(n+1)^{th}$ valley (e.g., is changed from the $1^{st}$ valley to the $2^{nd}$ valley), the switching frequency of the drive signal 352 drops to a frequency magnitude and the lower frequency limit (e.g., $F_{dec}$), but the signal 373 (e.g., $V_{FB\_in}$) becomes larger. Also, as shown by the waveform 620, when the valley of the voltage difference from the drain terminal 322 to the source terminal 326 at which a switching cycle starts is changed from the $(n+1)^{th}$ valley to the $n^{th}$ valley (e.g., is changed from the $2^{nd}$ valley to the $1^{st}$ valley), the switching frequency of the drive signal 352 jumps to a higher frequency magnitude, but the signal 373 (e.g., $V_{FB\_in}$) becomes smaller. Therefore, as shown in FIG. 6, when the valley of the voltage difference from the drain terminal 322 to the source terminal 326 at which a switching cycle starts is changed, the switching frequency of the drive signal 352 changes suddenly by a significant magnitude, and the signal 373 (e.g., $V_{FB\_in}$) changes back to a previous magnitude.

Hence it is highly desirable to improve the techniques related to quasi-resonant switching power supplies.

3. BRIEF SUMMARY OF THE INVENTION

Certain embodiments of the present invention are directed to circuits. More particularly, some embodiments of the invention provide systems and methods for valley locking. Merely by way of example, some embodiments of the invention have been applied to quasi-resonant switching power supplies. But it would be recognized that the invention has a much broader range of applicability.

In some embodiments, a controller for a quasi-resonant switching power supply includes: a valley detector configured to receive a voltage signal, detect one or more voltage valleys of the voltage signal in magnitude, and generate a detection signal representing the detected one or more voltage valleys; a valley-locking controller configured to receive one or more signals, generate a mode control signal that indicates a selected valley-locking mode based at least in part on the one or more signals, select from the detected one or more voltage valleys, one or more valleys that correspond to the selected valley-locking mode, and generate a valley control signal indicating the one or more selected valleys; and a gate driver configured to generate a drive signal based on at least information associated with the valley control signal and change the drive signal from a first logic level to a second logic level to start multiple switching cycles in response to the one or more selected valleys; wherein, in the selected valley-locking mode, the valley-locking controller is further configured to select one or more $n^{th}$ valleys of the voltage signal and one or more $(n+1)^{th}$ valleys of the voltage signal as the one or more selected valleys, n being a positive integer; and the gate driver is further configured to: start one or more first switching cycles of the multiple switching cycles at the one or more $n^{th}$ valleys of the voltage signal respectively; and start one or more second switching cycles of the multiple switching cycles at the one or more $(n+1)^{th}$ valleys of the voltage signal respectively.

In certain embodiments, a method for a quasi-resonant switching power supply includes: receiving a voltage signal; detecting one or more voltage valleys of the voltage signal in magnitude; generating a detection signal representing the detected one or more voltage valleys; receiving one or more signals; generating a mode control signal that indicates a selected valley-locking mode based at least in part on the one or more signals; selecting from the detected one or more voltage valleys, one or more valleys that correspond to the selected valley-locking mode; generating a valley control signal indicating the one or more selected valleys; processing information associated with the valley control signal; generating a drive signal based on at least information associated with the valley control signal; and changing the drive signal from a first logic level to a second logic level to start multiple switching cycles in response to the one or more selected valleys; wherein, in the selected valley-locking mode, the selecting from the detected one or more voltage valleys, one or more valleys that correspond to the selected valley-locking mode includes: selecting one or more $n^{th}$ valleys of the voltage signal and one or more $(n+1)^{th}$ valleys of the voltage signal as the one or more selected valleys, n being a positive integer; wherein, in the selected valley-locking mode, the changing the drive signal from a first logic level to a second logic level to start multiple switching cycles in response to the one or more selected valleys includes: starting one or more first switching cycles of the multiple switching cycles at the one or more $n^{th}$ valleys of the voltage signal respectively; and starting one or more second switching cycles of the multiple switching cycles at the one or more $(n+1)^{th}$ valleys of the voltage signal respectively.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for valley locking. Merely by way of example, some embodiments of the invention have been applied to quasi-resonant switching power supplies. But it would be recognized that the invention has a much broader range of applicability.

Figure 1:
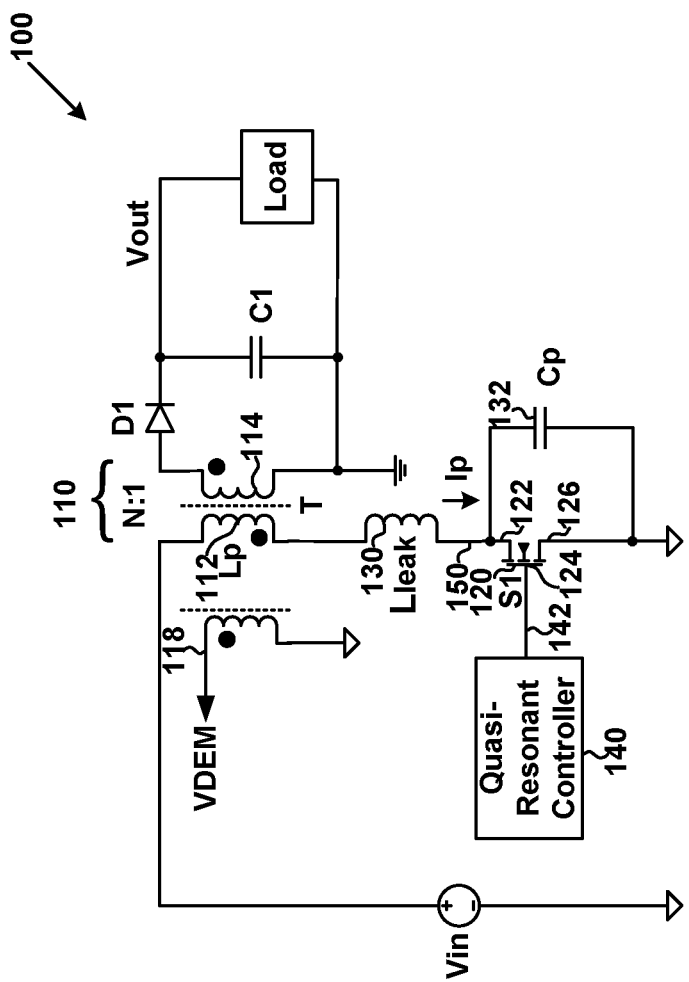
FIG. 1 is a simplified diagram showing a conventional quasi-resonant switching power supply.
Figure 2:
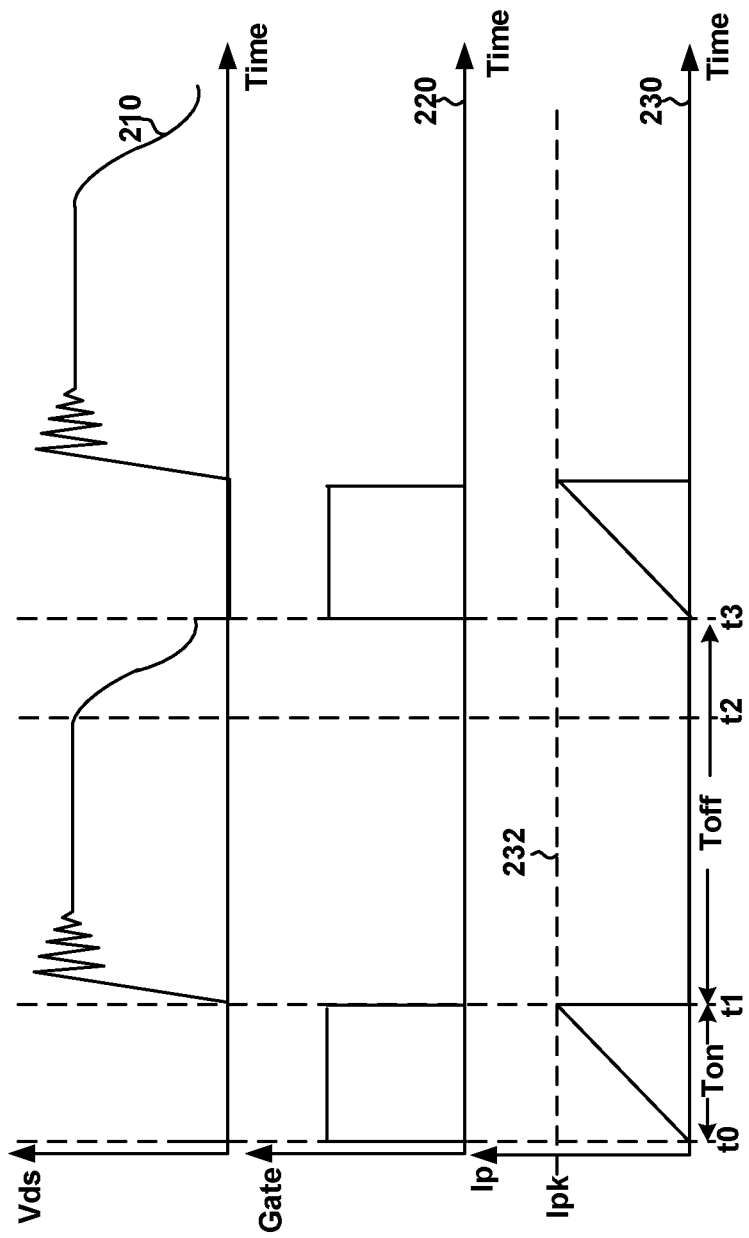
FIG. 2 shows a simplified timing diagram for the conventional quasi-resonant switching power supply as shown in FIG. 1.
Figure 3:
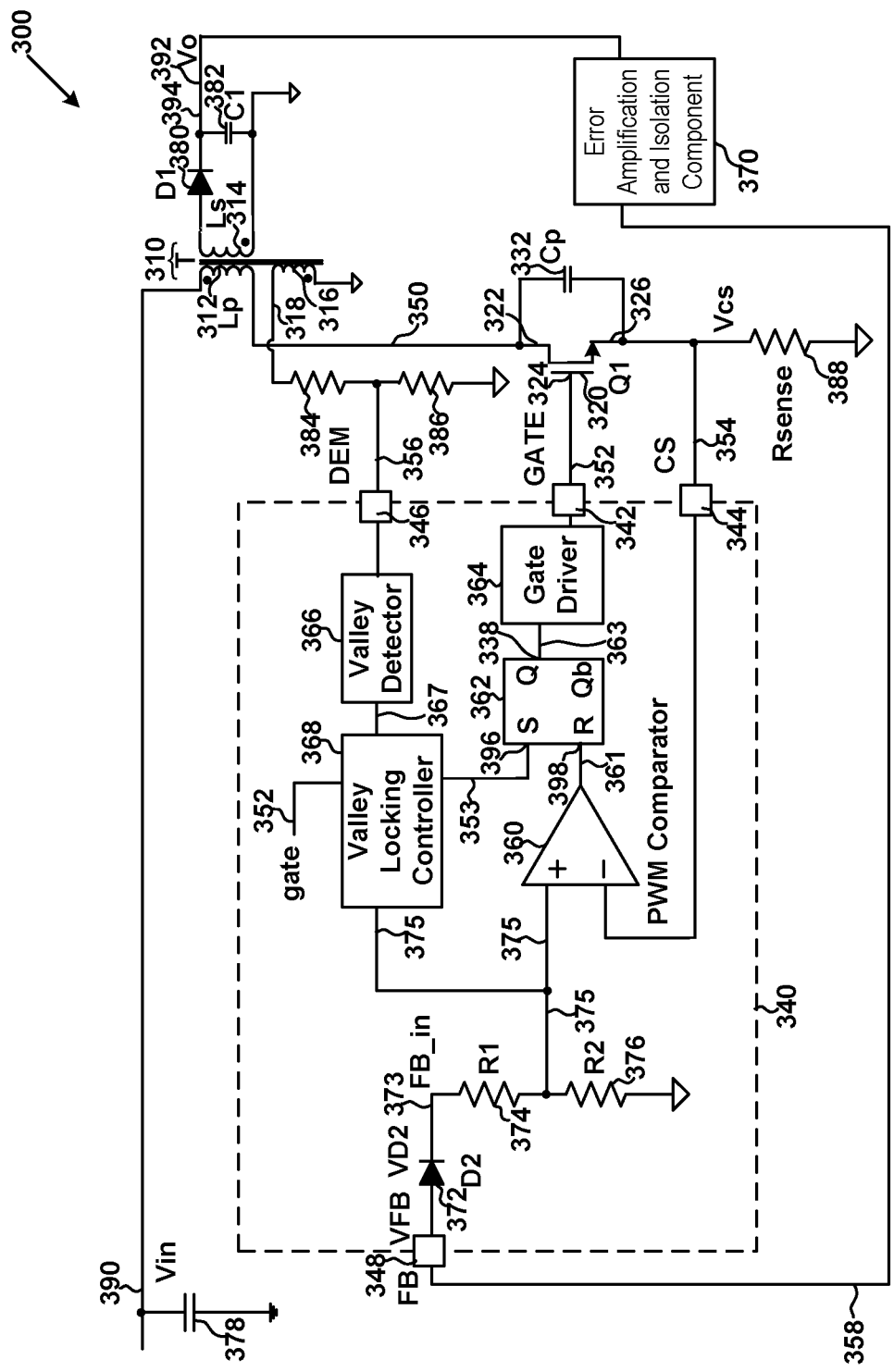
FIG. 3 is a simplified diagram showing a conventional quasi-resonant switching power supply with a valley locking mechanism.
Figure 4:
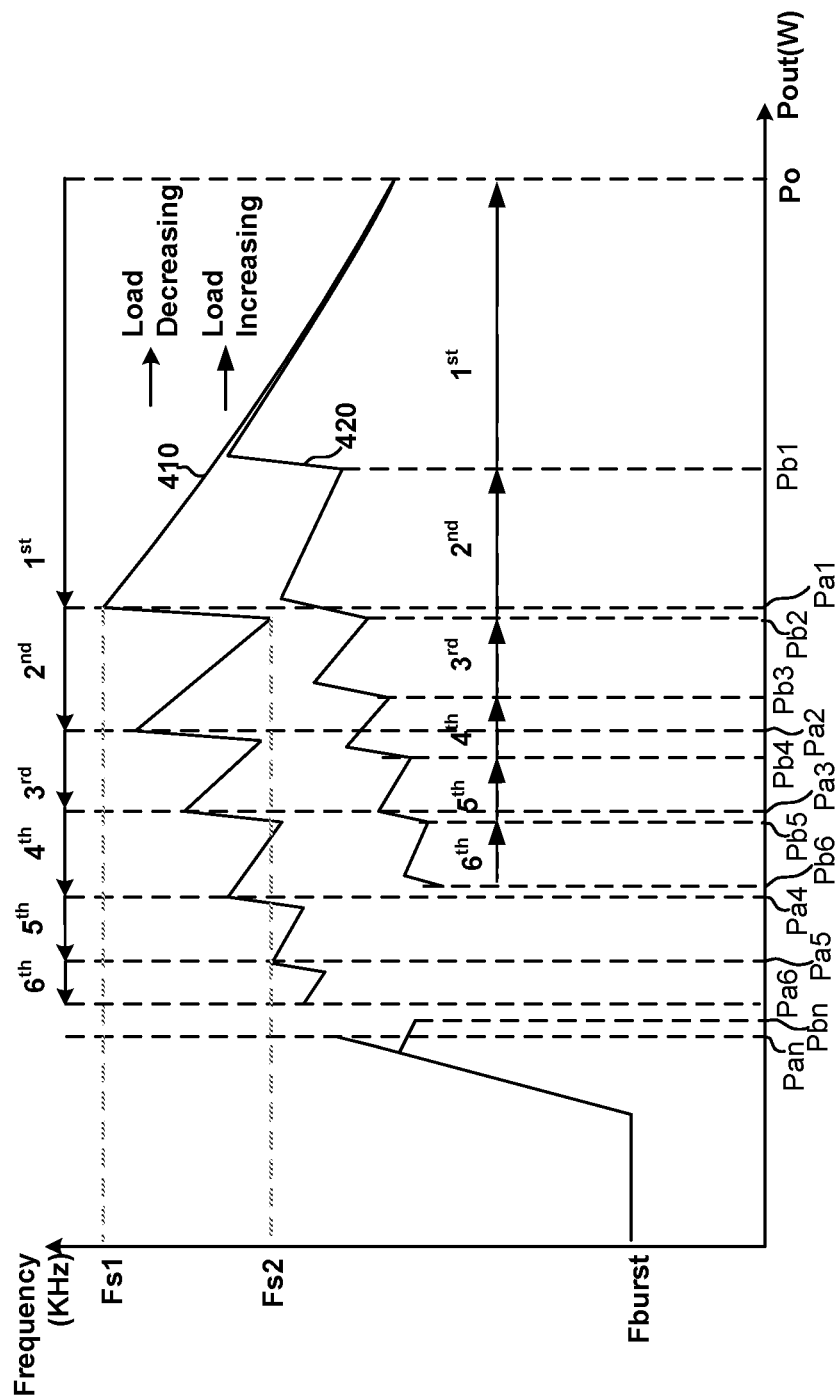
FIG. 4 shows a simplified diagram for the conventional quasi-resonant switching power supply with a valley locking mechanism as shown in FIG. 3.
Figure 5:
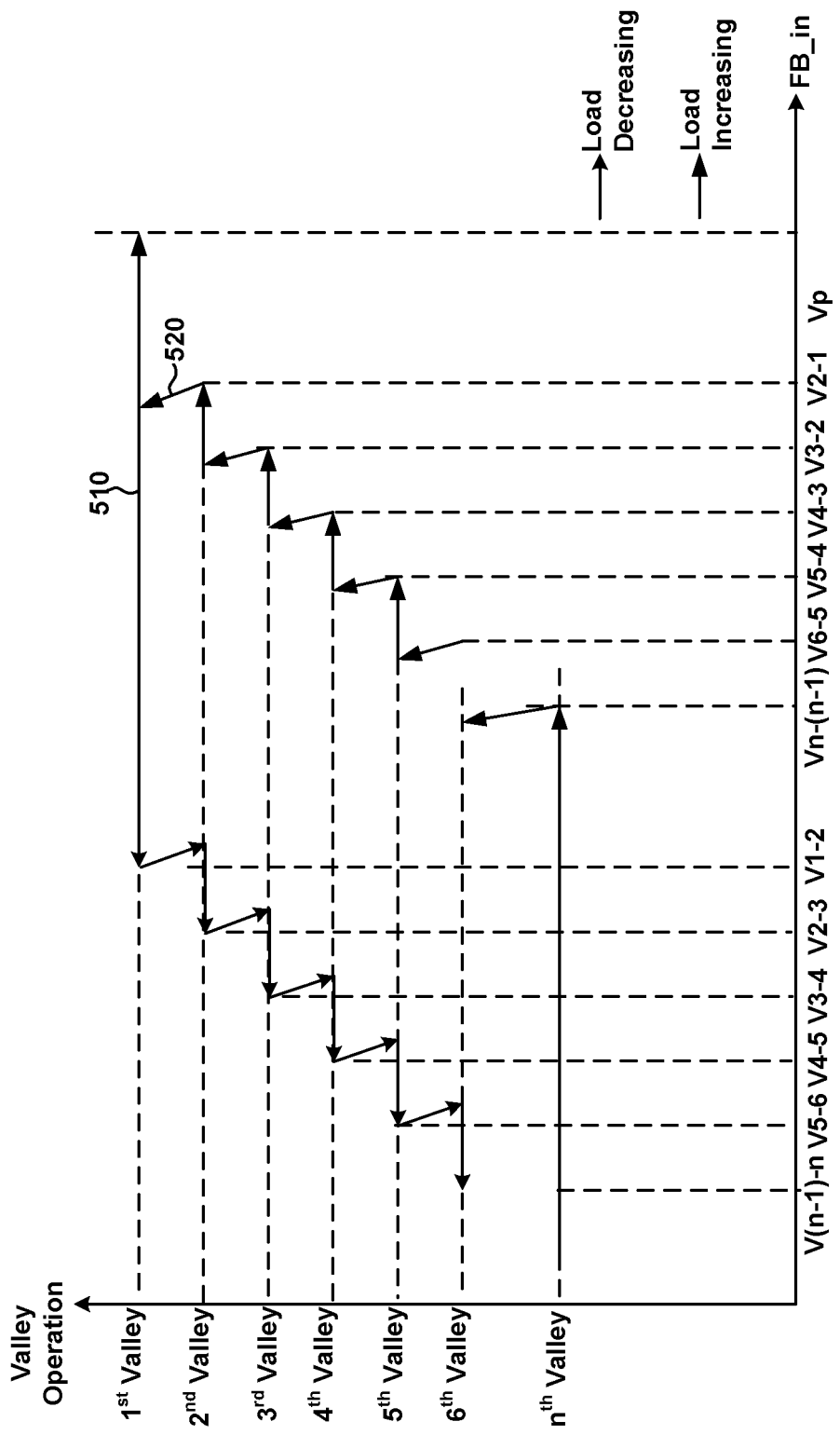
FIG. 5 shows a simplified diagram for the conventional quasi-resonant switching power supply with a valley locking mechanism that uses the signal (e.g., $V_{FB\_in}$) as shown in FIG. 3.
Figure 6:
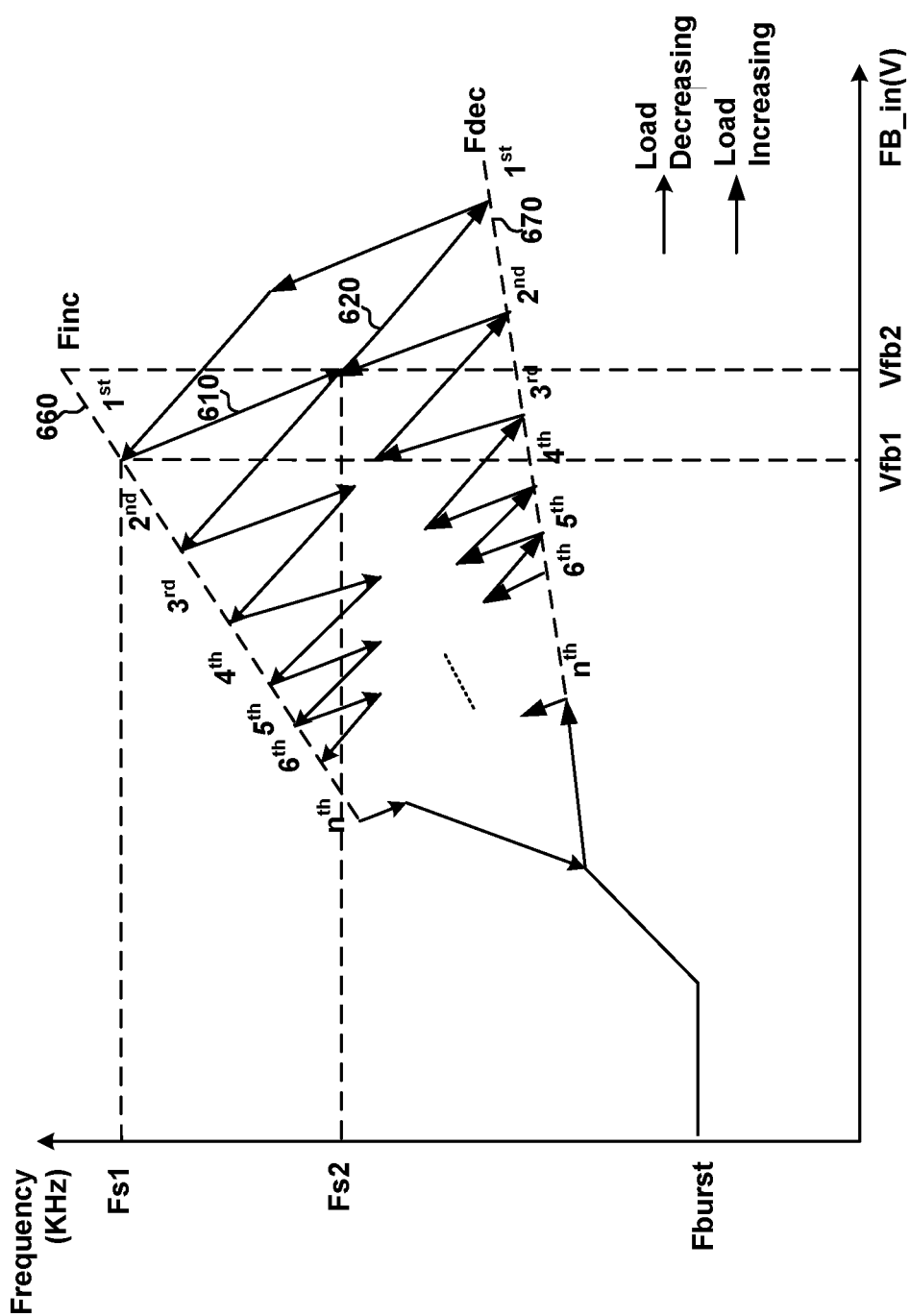
FIG. 6 shows a simplified diagram for the conventional quasi-resonant switching power supply with a valley locking mechanism that uses the drive signal as shown in FIG. 3.

As shown in FIG. 6, for the quasi-resonant switching power supply 300, when the output current 394 decreases to a current magnitude as the output voltage 392 remains constant (e.g., when the output load of the quasi-resonant switching power supply 300 decreases to a load magnitude), the valley of the voltage difference from the drain terminal 322 to the source terminal 326 at which a switching cycle starts is changed from the $1^{st}$ valley for all switching cycles to the $2^{nd}$ valley for all switching cycles according to certain embodiments. As an example, before this change of the locked valley, the switching frequency of the drive signal 352 is equal to the frequency magnitude $F_{s1}$, the signal 373 (e.g., $V_{FB\_in}$) is equal to the voltage magnitude $V_{fb1}$, and the peak magnitude of the current 350 (e.g., $I_p$) is equal to a peak magnitude $I_{pk1}$. For example, after this change of the locked valley, the switching frequency of the drive signal 352 is equal to the frequency magnitude $F_{s2}$, the signal 373 (e.g., $V_{FB\_in}$) is equal to the voltage magnitude $V_{fb2}$, and the peak magnitude of the current 350 (e.g., $I_p$) is equal to a peak magnitude $I_{pk2}$.

According to some embodiments, the output power of the quasi-resonant switching power supply 300 remains approximately unchanged when the valley of the voltage difference from the drain terminal 322 to the source terminal 326 at which a switching cycle starts is changed from the $1^{st}$ valley to the $2^{nd}$ valley.

In certain examples, the quasi-resonant switching power supply 300 satisfies the following three equations:

$$\frac{1}{2}L_p \times F_{s1} \times I_{pk1}^2 = \frac{1}{2}L_p \times F_{s2} \times I_{pk2}^2 \quad \text{(Equation 2)}$$

$$V_{fb1} = K_L \times I_{pk1} \times R_{sense} \quad \text{(Equation 3)}$$

$$V_{fb2} = K_L \times I_{pk2} \times R_{sense} \quad \text{(Equation 4)}$$

where $L_p$ represents the inductance of the primary winding 312, and $R_{sense}$ represents the resistance of the resistor 388. Additionally, $F_{s1}$ represents the frequency magnitude of the switching frequency of the drive signal 352, $I_{pk1}$ represents the peak magnitude of the current 350 (e.g., $I_p$), and $V_{fb1}$ represents the voltage magnitude of the signal 373 (e.g., $V_{FB\_in}$), all before the valley of the voltage difference from the drain terminal 322 to the source terminal 326 at which a switching cycle starts is changed from the $1^{st}$ valley to the $2^{nd}$ valley. Moreover, $F_{s2}$ represents the frequency magnitude of the switching frequency of the drive signal 352, $I_{pk2}$ represents the peak magnitude of the current 350 (e.g., $I_p$), and $V_{fb2}$ represents the voltage magnitude of the signal 373 (e.g., $V_{FB\_in}$), all after the valley of the voltage difference from the drain terminal 322 to the source terminal 326 at which a switching cycle starts is changed from the $1^{st}$ valley to the $2^{nd}$ valley. Also, $K_L$ represents a loop gain that, for example, is determined as follows:

$$K_L = \frac{R2}{R1 + R2} \quad \text{(Equation 5)}$$

where $R_1$ represents the resistance of the resistor 374, and $R_2$ represents the resistance of the resistor 376. For example, based on Equations 2, 3, and 4, the following can be obtained:

$$\frac{v_{fb2}}{v_{fb1}} = \frac{I_{pk2}}{I_{pk1}} = \sqrt{\frac{F_{S1}}{F_{S2}}} \quad \text{(Equation 6)}$$

In some examples, without considering any changes in the on-time period of a switching cycle and any changes in the demagnetization time of a demagnetization process, the following equation is obtained:

$$F_{s2} = \frac{1}{\frac{1}{F_{S1}} + t_q} \quad \text{(Equation 7)}$$

wherein $F_{s1}$ represents the frequency magnitude of the switching frequency of the drive signal 352 before the valley of the voltage difference from the drain terminal 322 to the source terminal 326 at which a switching cycle starts is changed from the $1^{st}$ valley to the $2^{nd}$ valley, and $F_{s2}$ represents the frequency magnitude of the switching frequency of the drive signal 352 after the valley of the voltage difference from the drain terminal 322 to the source terminal 326 at which a switching cycle starts is changed from the $1^{st}$ valley to the $2^{nd}$ valley. Additionally, $T_q$ represents one resonance period for the free oscillation of the primary winding 312 and the parasitic capacitor 332.

In certain embodiments, with the output power of the quasi-resonant switching power supply 300 remaining approximately unchanged, if the valley of the voltage difference from the drain terminal 322 to the source terminal 326 at which a switching cycle starts is changed from the $1^{st}$ valley for all switching cycle to the $2^{nd}$ valley for all switching cycle, the switching frequency of the drive signal 352 decreases from the frequency magnitude $F_{s1}$ to the frequency magnitude $F_{s2}$ and the signal 373 (e.g., $V_{FB\_in}$) increases from the voltage magnitude of $V_{fb1}$ to the voltage magnitude of $V_{fb2}$, wherein the frequency magnitude $F_{s2}$ is smaller than the frequency magnitude $F_{s1}$ as shown by Equation 7 and the voltage magnitude of $V_{fb2}$ is larger than the voltage magnitude of $V_{fb1}$ according to Equation 6.

In some embodiments, according to Equation 6, if the valley of the voltage difference from the drain terminal 322 to the source terminal 326 at which a switching cycle starts is changed from the $1^{st}$ valley for all switching cycle to the $2^{nd}$ valley for all switching cycle, the peak magnitude of the current 350 (e.g., $I_p$) increases from $I_{pk1}$ to $I_{pk2}$, so the on-time period of a switching cycle and the demagnetization time of a demagnetization process both also increase, causing the frequency magnitude $F_{s2}$ to decreases further from what is determined by Equation 6 until an energy equilibrium is reached.

Figure 7:
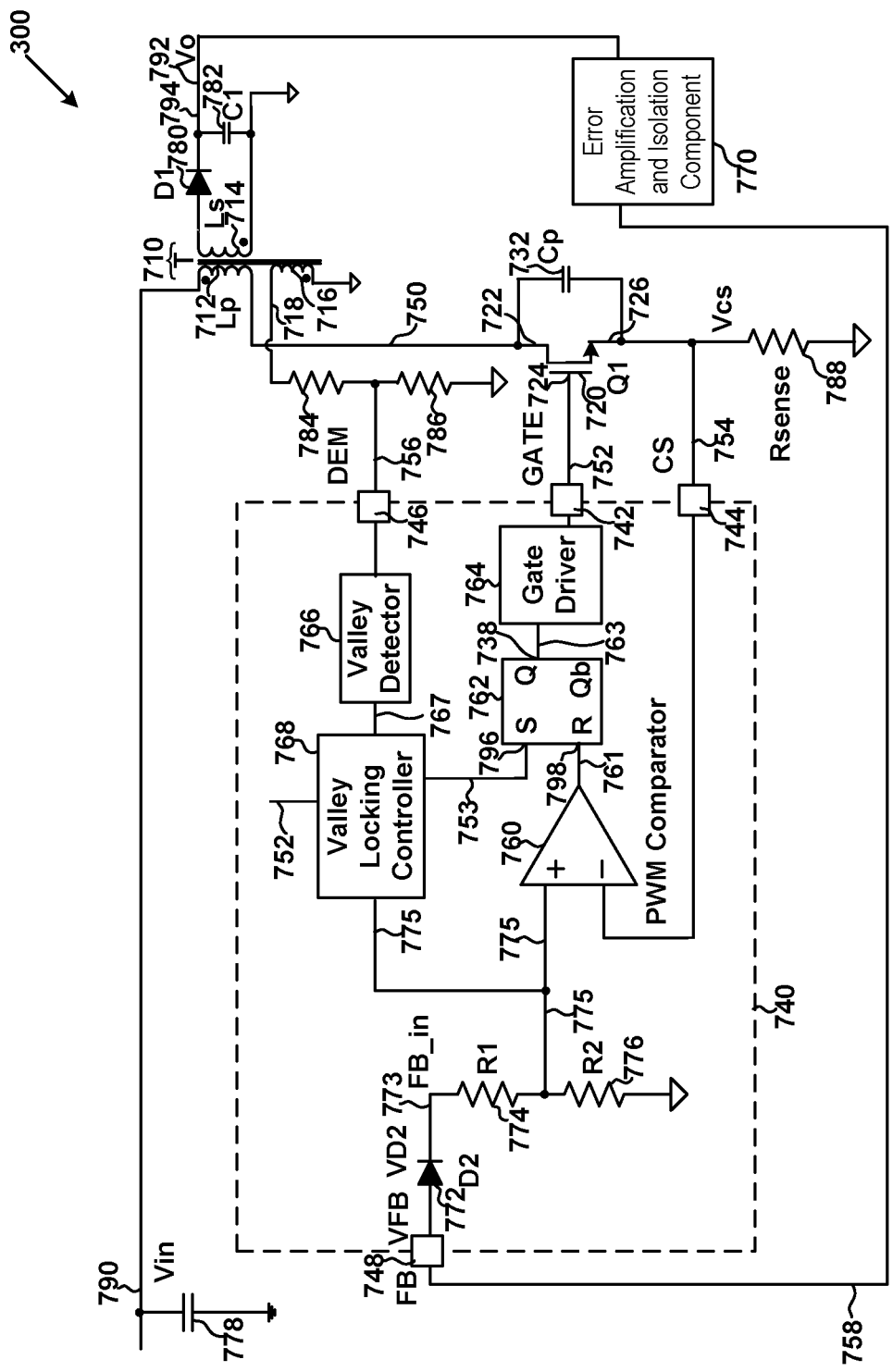
FIG. 7 is a simplified diagram showing a quasi-resonant switching power supply with a valley locking mechanism according to certain embodiments of the present invention.

FIG. 7 is a simplified diagram showing a quasi-resonant switching power supply with a valley locking mechanism according to certain embodiments of the present invention. This diagram is merely an example, which should not unduly limit the scope of the claims. One of ordinary skill in the art would recognize many variations, alternatives, and modifications. The quasi-resonant switching power supply 700 includes a transformer 710, a transistor 720, a quasi-resonant controller 740, an error amplification and isolation component 770, a diode 780, capacitors 778 and 782, resistors 784, 786 and 788. In some examples, the transformer 710 includes a primary winding 712 (e.g., $L_p$), a secondary winding 714, and an auxiliary winding 716. For example, the auxiliary winding 716 includes a terminal 718. In certain examples, the transistor 720 includes a drain terminal 722, a gate terminal 724, and a source terminal 726. As an example, the drain terminal 722 of the transistor 720 is connected to the primary winding 712 (e.g., $L_p$). For example, the quasi-resonant controller 740 sends a drive signal 752 to the gate terminal 724 to turn on or turn off the transistor 720. As an example, the transistor 720 (e.g., $Q_1$) includes a parasitic capacitor 732 (e.g., $C_p$) between the drain terminal 722 and the source terminal 726 of the transistor 720. For example, the transistor 720 is a MOSFET transistor, a BJT-NPN transistor, an IGBT transistor, and/or a GaN transistor. In some examples, when the quasi-resonant switching power supply 700 operates in a valley switching mode, the quasi-resonant switching power supply 700 operates in one valley-locking mode selected from multiple valley-locking modes. For example, when the quasi-resonant switching power supply 700 operates in a valley switching mode, the quasi-resonant switching power supply 700 changes from operating in one valley-locking mode to operating in another valley-locking mode. Although the above has been shown using a selected group of components for the quasi-resonant switching power supply 700, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 7, the quasi-resonant controller 740 includes a terminal 742 (e.g., GATE), a terminal 744 (e.g., CS), a terminal 746 (e.g., DEM), and a terminal 748 (e.g., FB) according to some embodiments. For example, the quasi-resonant controller 740 includes a diode 772 (e.g., $D_2$), a resistor 774 (e.g., $R_1$), a resistor 776 (e.g., $R_2$), a comparator 760, a flip-flop 762, a gate driver 764, a valley detector 766, and a valley locking controller 768. As an example, the terminal 742 (e.g., GATE) outputs the drive signal 752, the terminal 744 (e.g., CS) receives a signal 754 (e.g., $V_{CS}$) from the resistor 788 (e.g., $R_{sense}$), the terminal 746 (e.g., DEM) receives a signal 756 from the resistors 784 and 786, and the terminal 748 (e.g., FB) receives a signal 758 from the error amplification and isolation component 770. For example, the quasi-resonant switching power supply 700 supplies an output power (e.g., $P_{out}$) to an output load by providing an output voltage 792 (e.g., $V_o$) and an output current 794 (e.g., $I_o$).

In certain embodiments, when the transistor 720 (e.g., $Q_1$) is turned on, a current 750 (e.g., $I_p$) flows from the primary winding 712 through the transistor 720, an input voltage 790 (e.g., $V_{in}$) charges the primary winding 712, the diode 780 (e.g., $D_1$) is turned off, the capacitor 782 (e.g., $C_1$) supplies the output power (e.g., $P_{out}$) to the output load by providing the output voltage 792 (e.g., $V_o$) and the output current 794 (e.g., $I_o$), and the output voltage 792 (e.g., $V_o$) is fed back as the signal 758 to the quasi-resonant controller 740 by the error amplification and isolation component 770. In some examples, the signal 758 is received by the diode 772 (e.g., $D_2$) and becomes a signal 773 (e.g., $V_{FB\_in}$). For example, the signal 773 (e.g., $V_{FB\_in}$) is processed by a voltage divider that includes the resistor 774 (e.g., $R_1$) and the resistor 776 (e.g., $R_2$). As an example, the voltage divider outputs a signal 775 to the comparator 760, which also receives the signal 754 (e.g., $V_{CS}$) and generates a signal 761. For example, the signal 775 represents the output voltage 792 (e.g., $V_o$) of the quasi-resonant switching power supply 700, even if the signal 775 is not equal to the output voltage 792 (e.g., $V_o$). In certain examples, the signal 761 is received by the flip-flop 762 that is coupled to the gate driver 764, and the signal 761 is used to control the switching frequency and the duty cycle of the drive signal 752 in order to keep the output voltage 792 (e.g., $V_o$) constant.

In some embodiments, when the transistor 720 (e.g., $Q_1$) is turned off, the primary winding 712 undergoes a demagnetization process, the diode 780 (e.g., $D_1$) is turned on, and the secondary winding 714 charges the capacitor 782 (e.g., $C_1$) and also supplies power to the output load. For example, after the demagnetization process of the primary winding 712 is completed, the primary winding 712 (e.g., $L_p$) and the parasitic capacitor 732 (e.g., $C_p$) starts free oscillation. As an example, during the free oscillation, the resonance period is determined as follows:

$$T_q = 2\pi\sqrt{L_p \times C_p} \qquad \text{(Equation 8)}$$

wherein $T_q$ represents the resonance period for the free oscillation of the primary winding 712 and the parasitic capacitor 732. Additionally, $L_p$ represents the inductance of the primary winding 712, and $C_p$ represents the capacitance of the parasitic capacitor 732.

As shown in FIG. 7, the voltage at the terminal 718 of the auxiliary winding 716 is processed by a voltage divider that includes the resistors 784 and 786 according to certain embodiments. For example, one terminal of the resistor 784 is connected to the auxiliary winding 716 coupled to the primary winding 712 (e.g., $L_p$) and the secondary winding 714. In some examples, the voltage divider outputs the signal 756 to the valley detector 766, which in response generates a signal 767, which includes one or more pulses that represent one or more valleys of the voltage difference from the drain terminal 722 to the source terminal 726. For example, the signal 767 is received by the valley locking controller 768, which selects one pulse from the one or more pulses to start a switching cycle. As an example, the decision about which one pulse is selected from the one or more pulses is made by the valley locking controller 768 based at least in part on the signal 775 and/or the drive signal 752. In certain examples, the signal 775 and the drive signal 752 are also received by the valley locking controller 768. As an example, the signal 775, which represents the magnitude of the signal 773 (e.g., $V_{FB\_in}$), is compared with a predetermined threshold (e.g., a threshold voltage) and is used to make the decision by the valley locking controller 768. For example, the switching frequency of the drive signal 752 is compared with a predetermined threshold frequency and is used to make the decision by the valley locking controller 768.

According to some embodiments, the valley locking controller 768 receives the signal 767, the signal 775 and the drive signal 752 and generates a signal 753 that represents the selected pulse to start a switching cycle. In certain examples, the flip-flop 762 includes an input terminal 796 (e.g., S), an input terminal 798 (e.g., R), and an output terminal 738 (e.g., Q). For example, the signal 753 is received by the input terminal 796 (e.g., S) of the flip-flop 762, and the signal 761 is received by the input terminal 798 (e.g., R) of the flip-flop 762. As an example, the signal 763 is outputted by the output terminal 738 (e.g., Q) of the flip-flop 762 and is received by the gate driver 764. In some examples, the gate driver 764 generates the drive signal 752 based at least in part on the signal 763 and sends the drive signal 752 to the gate terminal 724 of the transistor 720 through the terminal 742 (e.g., GATE) of the quasi-resonant controller 740. For example, when the drive signal 752 changes from one logic level (e.g., a logic low level) to another logic level (e.g., the logic high level), the transistor 720 is turned on.

According to certain embodiments, the valley locking controller 768 selects the $n^{th}$ valley to start each of some switching cycles and selects the $(n+1)^{th}$ valley to start each of other switching cycles, where n is a positive integer (e.g., n being equal to 1). In some examples, the valley of the voltage difference from the drain terminal 722 to the source terminal 726 at which a switching cycle starts alternates between the $n^{th}$ valley and the $(n+1)^{th}$ valley, where n is the positive integer. For example, the valley of the voltage difference from the drain terminal 722 to the source terminal 726 at which a switching cycle starts is locked at the $n^{th}$ valley, and the valley of the voltage difference from the drain terminal 722 to the source terminal 726 at which another switching cycle starts is locked at the $(n+1)^{th}$ valley, where the another switching cycle immediately follows the switching cycle, with n being the positive integer. In certain examples, for a valley-locking mode in which the valley locking controller 768 selects the $n^{th}$ valley to start each of some switching cycles and selects the $(n+1)^{th}$ valley to start each of other switching cycles, where n is a positive integer, the envelope frequency is higher than 20 KHz, reducing or eliminating the audio noise. As an example, for a valley-locking mode in which the valley locking controller 768 selects the $n^{th}$ valley to start each of some switching cycles and selects the $(n+1)^{th}$ valley to start each of other switching cycles, where n is a positive integer, the spectrum of the switching frequency is dispersed, reducing or eliminating conducted electromagnetic interference.

As discussed above and further emphasized here, FIG. 7 is merely an example, which should not unduly limit the scope of the claims. One of ordinary skill in the art would recognize many variations, alternatives, and modifications. In some examples, the valley locking controller 768 receives the signal 767, the signal 775 and the drive signal 752 and generates the signal 753 based at least in part upon the signal 767, the signal 775 and the drive signal 752. For example, the decision about which one pulse is selected from the one or more pulses is made by the valley locking controller 768 based at least in part on the signal 775 and the drive signal 752, and the signal 775 and the drive signal 752 are used to make the decision by the valley locking controller 768. As an example, the decision about which one pulse is selected from the one or more pulses is made by the valley locking controller 768 based at least in part on the signal 775 or the drive signal 752, and the signal 775 or the drive signal 752 is used to make the decision by the valley locking controller 768. In certain examples, the valley locking controller 768 receives the signal 767 and the signal 775 but does not receive the drive signal 752, and generates the signal 753 based at least in part upon the signal 767 and the signal 775. For example, the decision about which one pulse is selected from the one or more pulses is made by the valley locking controller 768 based at least in part on the signal 775, which represents the magnitude of the signal 773 (e.g., $V_{FB\_in}$). In some examples, the valley locking controller 768 receives the signal 767 and the drive signal 752 but does not receive the signal 775, and generates the signal 753 based at least in part upon the signal 767 and the drive signal 752. For example, the decision about which one pulse is selected from the one or more pulses is made by the valley locking controller 768 based at least in part on the drive signal 752 (e.g., based at least in part on the switching frequency of the drive signal 752).

Figure 8:
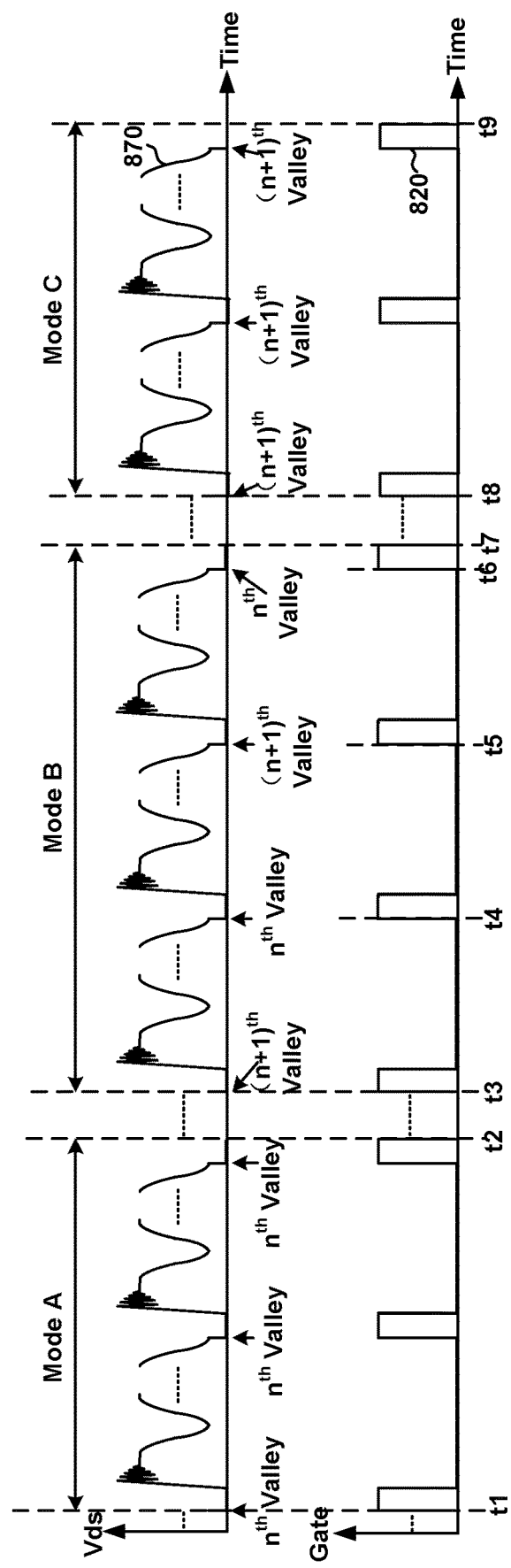
FIG. 8 shows a simplified timing diagram for the quasi-resonant switching power supply as shown in FIG. 7 according to certain embodiments of the present invention.

FIG. 8 shows a simplified timing diagram for the quasi-resonant switching power supply 700 as shown in FIG. 7 according to certain embodiments of the present invention. This diagram is merely an example, which should not unduly limit the scope of the claims. One of ordinary skill in the art would recognize many variations, alternatives, and modifications. The waveform 810 represents the voltage difference from the drain terminal 722 to the source terminal 726 of the transistor 720 of the quasi-resonant switching power supply 700 as a function of time, and the waveform 820 represents the drive signal 752 that is received by the gate terminal 724 of the transistor 720 of the quasi-resonant switching power supply 700 as a function of time.

According to some embodiments, from time $t_1$ to time $t_2$, the quasi-resonant switching power supply 700 operates in mode A of valley locking. For example, in mode A, the valley of the voltage difference from the drain terminal 722 to the source terminal 726 at which a switching cycle starts is locked at the $n^{th}$ valley for all switching cycles, where n is a positive integer (e.g., n being equal to 1).

According to certain embodiments, from time $t_3$ to time $t_7$, the quasi-resonant switching power supply 700 operates in mode B of valley locking. For example, in mode B, the valley of the voltage difference from the drain terminal 722 to the source terminal 726 at which a switching cycle starts is locked at the $n^{th}$ valley for some switching cycles and is locked at the $(n+1)^{th}$ valley for other switching cycles, where n is the positive integer (e.g., n being equal to 1). As an example, in mode B, the valley of the voltage difference from the drain terminal 722 to the source terminal 726 at which a switching cycle starts alternates between the $n^{th}$ valley and the $(n+1)^{th}$ valley, where n is the positive integer. For example, in mode B, the $n^{th}$ valley is locked to start a switching cycle J at time $t_3$, the $(n+1)^{th}$ valley is locked to start a switching cycle K at time $t_4$, the $n^{th}$ valley is locked to start a switching cycle L at time $t_5$, and the $(n+1)^{th}$ valley is locked to start a switching cycle M at time $t_6$, where n is the positive integer. For example, the switching cycle J is followed immediately by the switching cycle K, the switching cycle K is followed immediately by the switching cycle L, and the switching cycle L is followed immediately by the switching cycle K.

According to some embodiments, from time $t_8$ to time $t_9$, the quasi-resonant switching power supply 700 operates in mode C of valley locking. For example, in mode C, the valley of the voltage difference from the drain terminal 722 to the source terminal 726 at which a switching cycle starts is locked at the $(n+1)^{th}$ valley for all switching cycles, where n is the positive integer (e.g., n being equal to 1).

In certain embodiments, from time $t_1$ to time $t_9$, the output power (e.g., $P_{out}$) of the quasi-resonant switching power supply 700 decreases, and the quasi-resonant switching power supply 700 changes from mode A of valley locking to mode B of valley locking and then changes from mode B of valley locking to mode C of valley locking. For example, with the output voltage 792 (e.g., $V_o$) of the quasi-resonant switching power supply remaining constant, the output current 794 (e.g., $I_o$) of the quasi-resonant switching power supply decreases with time, causing the output power (e.g., $P_{out}$) of the quasi-resonant switching power supply 700 to decrease with time.

Figure 9:
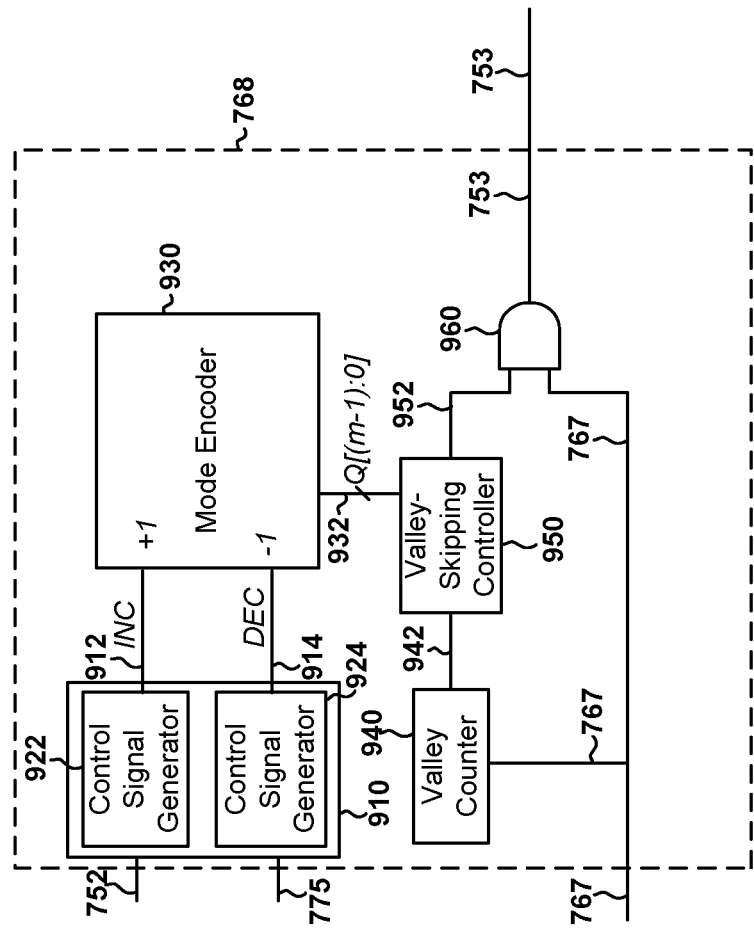
FIG. 9 is a simplified diagram showing certain components of the valley locking component of the quasi-resonant controller as part of the quasi-resonant switching power supply according to some embodiments of the present invention.

FIG. 9 is a simplified diagram showing certain components of the valley locking controller 768 of the quasi-resonant controller 740 as part of the quasi-resonant switching power supply 700 according to some embodiments of the present invention. This diagram is merely an example, which should not unduly limit the scope of the claims. One of ordinary skill in the art would recognize many variations, alternatives, and modifications. The valley locking controller 768 includes a mode controller 910 for valley selection, a mode encoder 930, a valley counter 940, a valley-skipping controller 950, an AND gate 960, and a valley selection controller 970. For example, the mode controller 910 for valley selection includes a control signal generator 922 for increasing mode number and a control signal generator 924 for reducing mode number. Although the above has been shown using a selected group of components for the valley locking controller 768, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the mode controller 910 for valley selection receives the signal 775 and the drive signal 752 and generates a mode control signal 912 and/or a mode control signal 914 based at least in part upon the signal 775 and the drive signal 752. For example, the mode control signal 912 represents increasing the valley-locking mode number by one (e.g., from the $p^{th}$ mode to the $(p+1)^{th}$ mode, where p is a positive integer). As an example, the mode control signal 914 represents decreasing the valley-locking mode number by one (e.g., from the $q^{th}$ mode to the $(q-1)^{th}$ mode, where q is an integer larger than 1). In certain examples, the mode signal 912 is generated by the control signal generator 922, and the mode signal 914 is generated by the control signal generator 924. In some examples, the mode control signal 912 and/or the mode control signal 914 are received by the mode encoder 930, which generates a mode control signal 932 that represents the selected valley-locking mode (e.g., the $(p+1)^{th}$ mode or the $(q-1)^{th}$ mode).

According to certain embodiments, some examples for the valley-locking modes of the quasi-resonant switching power supply 700 are provided as follows:

In the $j^{th}$ mode, the valley of the voltage difference from the drain terminal 722 to the source terminal 726 at which a switching cycle starts is locked at the $n^{th}$ valley for all switching cycles;

In the $(j+1)^{th}$ mode, the valley of the voltage difference from the drain terminal 722 to the source terminal 726 at which a switching cycle starts is locked at the $n^{th}$ valley for some switching cycles and is locked at the $(n+1)^{th}$ valley for other switching cycles; and In the $(j+2)^{th}$ mode, the valley of the voltage difference from the drain terminal 722 to the source terminal 726 at which a switching cycle starts is locked at the $(n+1)^{th}$ valley for all switching cycles;

where j is a positive integer and n is a positive integer.

In some examples, in order for the valley-locking mode of the quasi-resonant switching power supply 700 to change from the $j^{th}$ mode to the $(j+2)^{th}$ mode, the valley-locking mode of the quasi-resonant switching power supply 700 changes from the $j^{th}$ mode to the $(j+1)^{th}$ mode and then changes from the $(j+1)^{th}$ mode to the $(j+2)^{th}$ mode. As an example, the valley-locking mode of the quasi-resonant switching power supply 700 cannot change directly from the $j^{th}$ mode to the $(j+2)^{th}$ mode by skipping the $(j+1)^{th}$ mode. In certain examples, in order for the valley-locking mode of the quasi-resonant switching power supply 700 to change from the $(j+2)^{th}$ mode to the $j^{th}$ mode, the valley-locking mode of the quasi-resonant switching power supply 700 changes from the $(j+2)^{th}$ mode to the $(j+1)^{th}$ mode and then changes from the $(j+1)^{th}$ mode to the $j^{th}$ mode. As an example, the valley-locking mode of the quasi-resonant switching power supply 700 cannot change directly from the $(j+2)^{th}$ mode to the $j^{th}$ mode by skipping the $(j+1)^{th}$ mode.

According to some embodiments, certain examples for the valley-locking modes of the quasi-resonant switching power supply 700 are provided as follows:

In the $j^{th}$ mode, the valley of the voltage difference from the drain terminal 722 to the source terminal 726 at which a switching cycle starts is locked at the $n^{th}$ valley for all switching cycles;

In each mode of the $(j+1)^{th}$ mode(s), wherein i is an integer larger than or equal to 1 but smaller than or equal to k−1, the valley of the voltage difference from the drain terminal 722 to the source terminal 726 at which a switching cycle starts is locked at the $n^{th}$ valley for some switching cycles and is locked at the $(n+1)^{th}$ valley for other switching cycles; and In the $(j+k)^{th}$ mode, the valley of the voltage difference from the drain terminal 722 to the source terminal 726 at which a switching cycle starts is locked at the $(n+1)^{th}$ valley for all switching cycles;

where j is a positive integer, k is a positive integer larger than 1, and n is a positive integer. As an example, if k is a positive integer larger than 2, for two different $(j+i)^{th}$ modes, wherein i is an integer larger than or equal to 1 but smaller than or equal to k−1, the ratio of the number of the switching cycles that start at the $n^{th}$ valley to the number of the switching cycles that start at the $(n+1)^{th}$ are different in these two different $(j+i)^{th}$ modes.

In some examples, the quasi-resonant switching power supply 700 changes the valley-locking mode directly from a mode with a mode number (e.g., r) to another mode with another mode number (e.g., s), where r minus s is equal to 1 or equal to −1. In certain examples, the quasi-resonant switching power supply 700 cannot change the valley-locking mode directly from a mode with a mode number (e.g., r) to another mode with another mode number (e.g., s) if r minus s is not equal to 1 and is not equal to −1.

As shown in FIG. 9, the mode controller 910 generates the mode control signal 912 to increase the valley-locking mode number by one, or generates the mode control signal 914 to decrease the valley-locking mode number by one, according to certain embodiments. According to some embodiments, if the mode control signal 912 instructs the mode encoder 930 to increase the valley-locking mode number by one, the mode encoder 930 increases the valley-locking mode number by one (e.g., from the $p^{th}$ mode to the $(p+1)^{th}$ mode, where p is a positive integer) and generates the mode control signal 932 that represents the selected valley-locking mode (e.g., the $(p+1)^{th}$ mode, where p is the positive integer). According to certain embodiments, if the mode control signal 914 instructs the mode encoder 930 to decrease the valley-locking mode number by one, the mode encoder 930 decreases the valley-locking mode number by one (e.g., from the $q^{th}$ mode to the $(q-1)^{th}$ mode, where q is an integer larger than 1) and generates the mode control signal 932 that represents the selected valley-locking mode (e.g., the $(q-1)^{th}$ mode, where q is the integer larger than 1).

In certain embodiments, the mode control signal 932 represents the selected valley-locking mode by encoding the valley-locking mode number into a binary number Q. For example, Q (e.g., Q[(m−1):0] represents any binary number that includes m digits, m is a positive integer. As an example, if the selected valley-locking mode is the $1^{st}$ mode for all switching cycles, Q represents a binary number that is equal to zero. In some examples, if m is equal to 2, the mode control signal 932 includes two digital signals, one of which represents Q0 and the other of which represents Q1. For example, if Q1Q0 is equal to 00 in binary, the selected valley-locking mode is a mode in which, for all switching cycles, a switching cycle starts at the $1^{st}$ valley. As an example, if Q1Q0 is equal to 01 in binary, the selected valley-locking mode is a mode in which, for some switching cycles, a switching cycle starts at the $1^{st}$ valley, and for other switching cycles, a switching cycle starts at the $2^{nd}$ valley. For example, if Q1Q0 is equal to 10 in binary, the selected valley-locking mode is a mode in which, for all switching cycles, a switching cycle starts at the $2^{nd}$ valley. As an example, if Q1Q0 is equal to 11 in binary, the selected valley-locking mode is a mode in which, for some switching cycles, a switching cycle starts at the $2^{nd}$ valley, and for other switching cycles, a switching cycle starts at the $3^{rd}$ valley. In certain examples, if m is equal to 3, the mode control signal 932 includes three digital signals, one of which represents Q0, another of which represents Q1, and another of which represents Q2. For example, if Q2Q1Q0 is equal to 000 in binary, the selected valley-locking mode is a mode in which, for all switching cycles, a switching cycle starts at the $1^{st}$ valley. As an example, if Q2Q1Q0 is equal to 001 in binary, the selected valley-locking mode is a mode in which, for some switching cycles, a switching cycle starts at the $1^{st}$ valley, and for other switching cycles, a switching cycle starts at the $2^{nd}$ valley. For example, if Q2Q1Q0 is equal to 010 in binary, the selected valley-locking mode is a mode in which, for all switching cycles, a switching cycle starts at the $2^{nd}$ valley. As an example, if Q2Q1Q0 is equal to 011 in binary, the selected valley-locking mode is a mode in which, for some switching cycles, a switching cycle starts at the $2^{nd}$ valley, and for other switching cycles, a switching cycle starts at the $3^{rd}$ valley. For example, if Q2Q1Q0 is equal to 111 in binary, the selected valley-locking mode is a mode in which, for some switching cycles, a switching cycle starts at the $4^{th}$ valley, and for other switching cycles, a switching cycle starts at the $5^{th}$ valley.

In some embodiments, the signal 767 is received by the AND gate 960 and the valley counter 940. In certain examples, the signal 767 includes one or more pulses, each of which corresponds to a valley of the voltage difference from the drain terminal 722 to the source terminal 726. For example, within the one or more pulses, the signal 767 is at a logic high level, but outside the one or more pulses, the signal 767 is at a logic low level. In some examples, the valley counter 940 receives the signal 767, counts the number of valleys within one switching cycle and outputs a signal 942 that represents the counted number of valleys.

According to certain embodiments, the signal 942 is received by the valley-skipping controller 950, which also receives the mode control signal 932 and generates a logic signal 952. In some examples, the signal 942 represents a selected valley-locking mode, in which, for all switching cycles, a switching cycle always starts at the $n^{th}$ valley, where n is a positive integer. As an example, if the counted number of valleys as represented by the signal 942 is smaller than n, the logic signal 952 remains at a logic low level. For example, if the counted number of valleys as represented by the signal 942 becomes equal to n, the logic signal 952 changes from the logic low level to the logic high level. In certain examples, the signal 942 represents a selected valley-locking mode, in which, a switching cycle starts at the $n^{th}$ valley for some switching cycles and a switching cycle starts at the $(n+1)^{th}$ valley for other switching cycles, where n is a positive integer. As an example, for the some switching cycles that are predetermined to start at the $n^{th}$ valley, if the counted number of valleys as represented by the signal 942 becomes equal to n, the logic signal 952 changes from the logic low level to the logic high level. As an example, for the other switching cycles that are predetermined to start at the $(n+1)^{th}$ valley, if the counted number of valleys as represented by the signal 942 becomes equal to n+1, the logic signal 952 changes from the logic low level to the logic high level.

According to some embodiments, the AND gate 960 receives the logic signal 952 and the signal 767 and generates a signal 962. For example, the signal 767 includes one or more pulses, each of which corresponds to a valley of the voltage difference from the drain terminal 722 to the source terminal 726. As an example, when the signal 767 indicates that the valley at which a switching cycle should start has been detected by the valley detector 766, the logic signal 952 changes from the logic low level to the logic high level. In certain examples, the signal 962 remains at a logic low level until the signal 767 indicates that the valley at which a switching cycle should start has been detected by the valley detector 766, and the signal 962 includes a pulse that corresponds to the valley at which a switching cycle should start. In certain embodiments, the signal 962 is received by the valley selection controller 970, which generates the signal 753 that represents the selected valley to start a switching cycle.

FIG. 10A, FIG. 10B, FIG. 10C, FIG. 10D and FIG. 10E show simplified timing diagrams for the AND gate 960 of the valley locking controller 768 as part of the quasi-resonant controller 740 of the quasi-resonant switching power supply 700 as shown in FIG. 7 and FIG. 9 according to certain embodiments of the present invention. These diagrams are merely examples, which should not unduly limit the scope of the claims. One of ordinary skill in the art would recognize many variations, alternatives, and modifications.

Figure 10A:
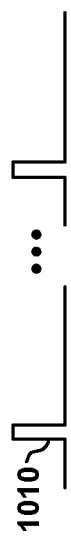
FIG. 10A, FIG. 10B, FIG. 10C, FIG. 10D and FIG. 10E show simplified timing diagrams for the AND gate of the valley locking component as part of the quasi-resonant controller of the quasi-resonant switching power supply as shown in FIG. 7 and FIG. 9 according to certain embodiments of the present invention.

According to some embodiments, in FIG. 10A, the waveform 1010 represents the signal 962 generated by the AND gate 960 as a function of time for the valley-locking mode in which each of all switching cycles starts at the corresponding $1^{st}$ valley. For example, each of the pulses in the waveform 1010 represents the $1^{st}$ valley for the corresponding switching cycle. As an example, at the $1^{st}$ valley, a switching cycle starts.

Figure 10B:

According to certain embodiments, in FIG. 10B, the waveform 1020 represents the signal 962 generated by the AND gate 960 as a function of time for the valley-locking mode in which each of some switching cycles starts at the corresponding $1^{st}$ valley and each of other switching cycles starts at the corresponding $2^{nd}$ valley. For example, one pulse in the waveform 1020 represents the $1^{st}$ valley for the corresponding switching cycle, and another pulse in the waveform 1020 represents the $2^{nd}$ valley for the corresponding switching cycle. As an example, a switching cycle starts at the $1^{st}$ valley, and another switching cycle starts at the $2^{nd}$ valley.

Figure 10C:
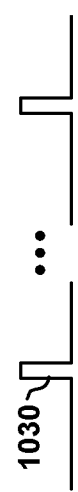

According to some embodiments, in FIG. 10C, the waveform 1030 represents the signal 962 generated by the AND gate 960 as a function of time for the valley-locking mode in which each of all switching cycles starts at the corresponding $2^{nd}$ valley. For example, each of the pulses in the waveform 1030 represents the $2^{nd}$ valley for the corresponding switching cycle. As an example, at the $2^{nd}$ valley, a switching cycle starts.

Figure 10D:

According to certain embodiments, in FIG. 10D, the waveform 1040 represents the signal 962 generated by the AND gate 960 as a function of time for the valley-locking mode in which each of some switching cycles starts at the corresponding $2^{nd}$ valley and each of other switching cycles starts at the corresponding $3^{rd}$ valley. For example, one pulse in the waveform 1040 represents the $2^{nd}$ valley for the corresponding switching cycle, and another pulse in the waveform 1040 represents the $3^{rd}$ valley for the corresponding switching cycle. As an example, a switching cycle starts at the $2^{nd}$ valley, and another switching cycle starts at the $3^{rd}$ valley.

Figure 10E:

According to some embodiments, in FIG. 10E, the waveform 1050 represents the signal 962 generated by the AND gate 960 as a function of time for the valley-locking mode in which each of all switching cycles starts at the corresponding $3^{rd}$ valley. For example, each of the pulses in the waveform 1050 represents the $3^{rd}$ valley for the corresponding switching cycle. As an example, at the $3^{rd}$ valley, a switching cycle starts.

Figure 11:
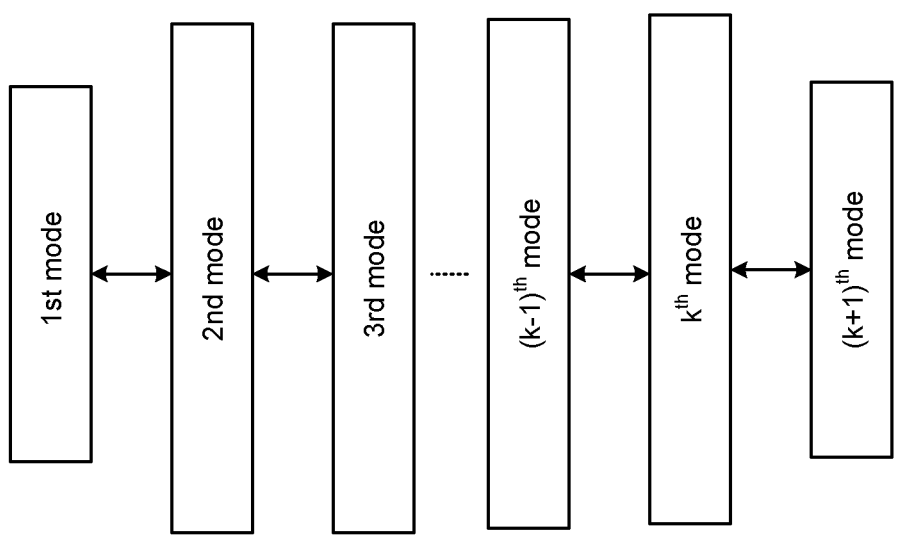
FIG. 11 is a simplified diagram showing certain changes between various valley-locking modes for the quasi-resonant controller as part of the quasi-resonant switching power supply as shown in FIG. 7 according to some embodiments of the present invention.

FIG. 11 is a simplified diagram showing certain changes between various valley-locking modes for the quasi-resonant controller 740 as part of the quasi-resonant switching power supply 700 as shown in FIG. 7 according to some embodiments of the present invention. This diagram is merely an example, which should not unduly limit the scope of the claims. One of ordinary skill in the art would recognize many variations, alternatives, and modifications.

According to certain embodiments, in the $1^{st}$ mode for valley locking, each of all switching cycles starts at the corresponding $1^{st}$ valley;

in the $2^{nd}$ mode for valley locking, for every group of k consecutive switching cycles, each of k−1 switching cycles starts at the corresponding $1^{st}$ valley and one switching cycle starts at the corresponding $2^{nd}$ valley;

in the $3^{rd}$ mode for valley locking, for every group of k consecutive switching cycles, each of k−2 switching cycles starts at the corresponding $1^{st}$ valley and one switching cycle starts at the corresponding $2^{nd}$ valley;

in the $(k-1)^{th}$ mode for valley locking, for every group of k consecutive switching cycles, each of two switching cycles starts at the corresponding $1^{st}$ valley and each of k−2 switching cycles starts at the corresponding $2^{nd}$ valley;

. . .

in the $k^{th}$ mode for valley locking, for every group of k consecutive switching cycles, one switching cycle starts at the corresponding $1^{st}$ valley and each of k−1 switching cycles starts at the corresponding $2^{nd}$ valley;

in the $(k+1)^{th}$ mode for valley locking, each of all switching cycles starts at the corresponding $2^{nd}$ valley.

where k is a positive integer larger than 1.

In some embodiments, for each of the $2^{nd}$ mode through the $k^{th}$ mode, k consecutive switching cycles form a valley-locking cycle. For example, if the average switching frequency in one mode of these valley-locking modes is $f_{avg}$, in order to ensure the envelope frequency is above $$20 \text{ KHz}, \frac{f_{avg}}{k} > 20 \text{ KHz}$$

needs to be satisfied.

In certain embodiments, the quasi-resonant switching power supply 700 changes the valley-locking mode directly between two modes that are adjacent to each other (e.g., between the $1^{st}$ mode and the $2^{nd}$ mode, between the $2^{nd}$ mode and the $3^{rd}$ mode, between the $(k-1)^{th}$ mode and the $k^{th}$ mode, and/or between the $k^{th}$ mode and the $(k+1)^{th}$ mode). In certain embodiments, the quasi-resonant switching power supply 700 cannot change the valley-locking mode directly between two modes that are not adjacent to each other by skipping one or more modes between these two modes. For example, the quasi-resonant switching power supply 700 cannot change the valley-locking mode directly between the $1^{st}$ mode and the $(k+1)^{th}$ mode.

Figure 12:
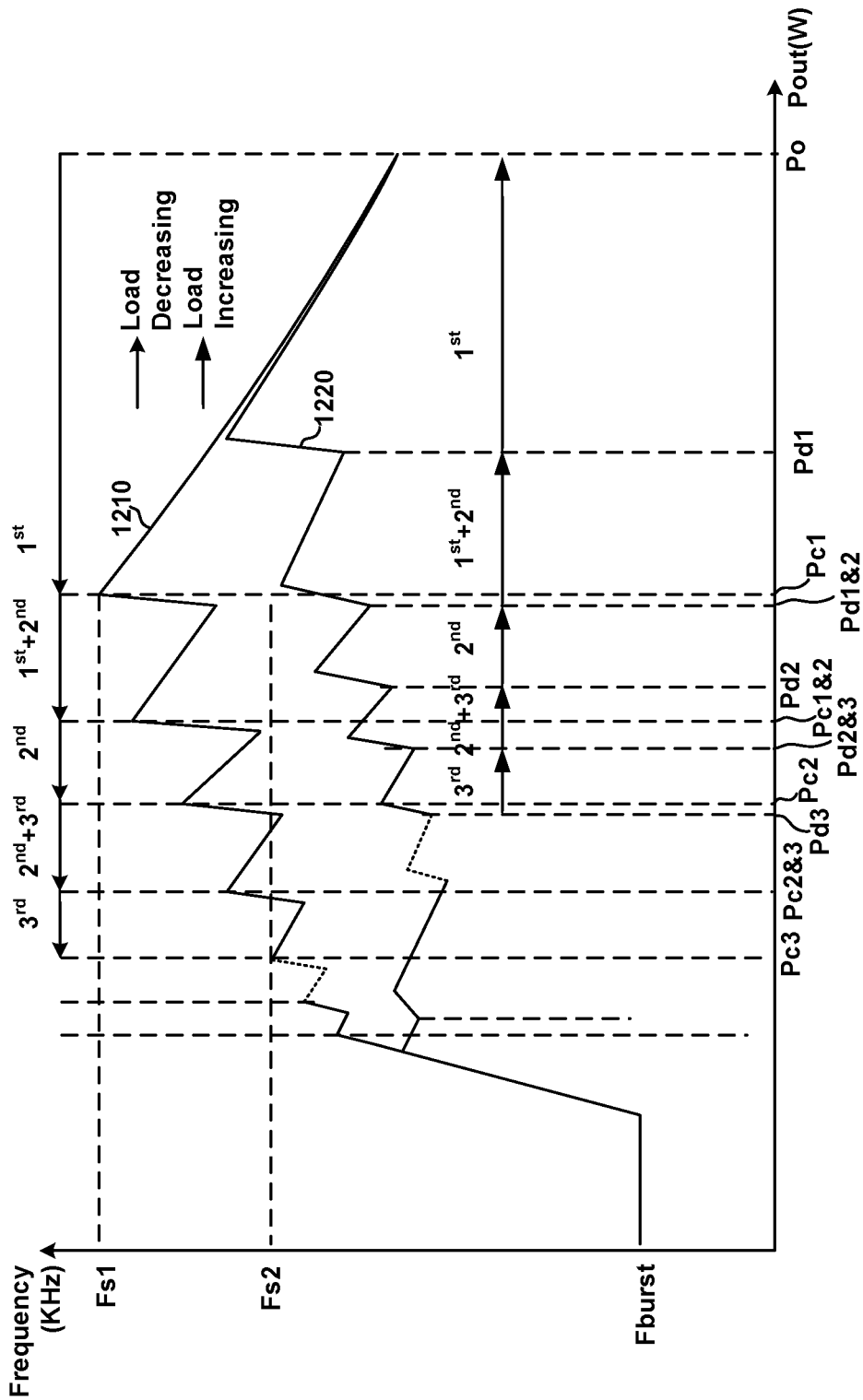
FIG. 12 shows a simplified diagram for the quasi-resonant switching power supply with a valley locking mechanism as shown in FIG. 7 according to some embodiments of the present invention.

FIG. 12 shows a simplified diagram for the quasi-resonant switching power supply 700 with a valley locking mechanism as shown in FIG. 7 according to some embodiments of the present invention. This diagram is merely an example, which should not unduly limit the scope of the claims. One of ordinary skill in the art would recognize many variations, alternatives, and modifications. The waveform 1210 represents the switching frequency as a function of the output power (e.g., $P_{out}$) when the output power (e.g., $P_{out}$) of the quasi-resonant switching power supply 700 decreases, and the waveform 1220 represents the switching frequency as a function of the output power (e.g., $P_{out}$) when the output power (e.g., $P_{out}$) of the quasi-resonant switching power supply 700 increases.

As shown by the waveform 1210, power level $P_0$ is larger than power level $P_{c1}$, the power level $P_{c1}$ is larger than power level $P_{c1\&2}$, the power level $P_{c1\&2}$ is larger than power level $P_{c2}$, the power level $P_{c2}$ is larger than power level $P_{c2\&3}$, and the power level $P_{c2\&3}$ is larger than power level $P_0$. When the output power (e.g., $P_{out}$) decreases from the power level $P_0$ to the power level $P_{c1}$, for all switching cycles, the valley of the voltage difference from the drain terminal 322 to the source terminal 326 at which a switching cycle starts is locked at the $1^{st}$ valley. At the power level $P_{c1}$, the valley of the voltage difference from the drain terminal 322 to the source terminal 326 at which a switching cycle starts remains to be the $1^{st}$ valley for some switching cycles but is changed from the $1^{st}$ valley to the $2^{nd}$ valley for other switching cycles. When the output power (e.g., $P_{out}$) decreases from the power level $P_{c1}$ to the power level $P_{c1\&2}$, for some switching cycles, the valley of the voltage difference from the drain terminal 322 to the source terminal 326 at which a switching cycle starts is locked at the $1^{st}$ valley, and for other switching cycles, the valley of the voltage difference from the drain terminal 322 to the source terminal 326 at which a switching cycle starts is locked at the $2^{nd}$ valley. At the power level $P_{c1\&2}$, the valley of the voltage difference from the drain terminal 322 to the source terminal 326 at which a switching cycle starts is changed from the $1^{st}$ valley for some switching cycles and the $2^{nd}$ valley for other switching cycles to the $2^{nd}$ valley for all switching cycles. When the output power (e.g., $P_{out}$) decreases from the power level $P_{c1\&2}$ to the power level $P_{c2}$, for all switching cycles, the valley of the voltage difference from the drain terminal 322 to the source terminal 326 at which a switching cycle starts is locked at the $2^{nd}$ valley. At the power level $P_{c2}$, the valley of the voltage difference from the drain terminal 322 to the source terminal 326 at which a switching cycle starts remains to be the $2^{nd}$ valley for some switching cycles but is changed from the $2^{nd}$ valley to the $3^{rd}$ valley for other switching cycles. When the output power (e.g., $P_{out}$) decreases from the power level $P_{c2}$ to the power level $P_{c2\&3}$, for some switching cycles, the valley of the voltage difference from the drain terminal 322 to the source terminal 326 at which a switching cycle starts is locked at the $2^{nd}$ valley, and for other switching cycles, the valley of the voltage difference from the drain terminal 322 to the source terminal 326 at which a switching cycle starts is locked at the $3^{rd}$ valley. At the power level $P_{c2\&3}$, the valley of the voltage difference from the drain terminal 322 to the source terminal 326 at which a switching cycle starts is changed from the $2^{nd}$ valley for some switching cycles and the $3^{rd}$ valley for other switching cycles to the $3^{rd}$ valley for all switching cycles. When the output power (e.g., $P_{out}$) decreases from the power level $P_{c2\&3}$ to the power level $P_{c3}$, for all switching cycles, the valley of the voltage difference from the drain terminal 322 to the source terminal 326 at which a switching cycle starts is locked at the $3^{rd}$ valley.

As shown by the waveform 1220, power level $P_0$ is larger than power level $P_{d1}$, the power level $P_{d1}$ is larger than power level $P_{d1\&2}$, the power level $P_{d1\&2}$ is larger than power level $P_{d2}$, the power level $P_{d2}$ is larger than power level $P_{d2\&3}$, the power level $P_{d2\&3}$ is larger than power level $P_{d3}$. When the output power (e.g., $P_{out}$) increases from the power level $P_{d3}$ to the power level $P_{d2\&3}$, for all switching cycles, the valley of the voltage difference from the drain terminal 322 to the source terminal 326 at which a switching cycle starts is locked at the $3^{rd}$ valley for all switching cycles. At the power level $P_{d2\&3}$, the valley of the voltage difference from the drain terminal 322 to the source terminal 326 at which a switching cycle starts remains to be the $3^{rd}$ valley for some switching cycles and is changed from the $3^{rd}$ valley to the $2^{nd}$ valley for other switching cycles. When the output power (e.g., $P_{out}$) increases from the power level $P_{d2\&3}$ to the power level $P_{d2}$, for some switching cycles, the valley of the voltage difference from the drain terminal 322 to the source terminal 326 at which a switching cycle starts is locked at the $3^{rd}$ valley, and for other switching cycles, the valley of the voltage difference from the drain terminal 322 to the source terminal 326 at which a switching cycle starts is locked at the $2^{nd}$ valley. At the power level $P_{d2}$, the valley of the voltage difference from the drain terminal 322 to the source terminal 326 at which a switching cycle starts is changed from the $3^{rd}$ valley for some switching cycles and the $2^{nd}$ valley for other switching cycles to the $2^{nd}$ valley for all switching cycles. When the output power (e.g., $P_{out}$) increases from the power level $P_{d2}$ to the power level $P_{d1\&2}$, for all switching cycles, the valley of the voltage difference from the drain terminal 322 to the source terminal 326 at which a switching cycle starts is locked at the $2^{nd}$ valley. At the power level $P_{d1\&2}$, the valley of the voltage difference from the drain terminal 322 to the source terminal 326 at which a switching cycle starts remains to be the $2^{nd}$ valley for some switching cycles and is changed from the $2^{nd}$ valley to the $1^{st}$ valley for other switching cycles. When the output power (e.g., $P_{out}$) increases from the power level $P_{d1\&2}$ to the power level $P_{d1}$, for some switching cycles, the valley of the voltage difference from the drain terminal 322 to the source terminal 326 at which a switching cycle starts is locked at the $2^{nd}$ valley, and for other switching cycles, the valley of the voltage difference from the drain terminal 322 to the source terminal 326 at which a switching cycle starts is locked at the $1^{st}$ valley. At the power level $P_{d1}$, the valley of the voltage difference from the drain terminal 322 to the source terminal 326 at which a switching cycle starts is changed from the $2^{nd}$ valley for some switching cycles and the $1^{st}$ valley for other switching cycles to the $1^{st}$ valley for all switching cycles. When the output power (e.g., $P_{out}$) increases from the power level $P_{d1}$ to the power level $P_0$, for all switching cycles, the valley of the voltage difference from the drain terminal 322 to the source terminal 326 at which a switching cycle starts is locked at the $1^{st}$ valley.

Figure 13:
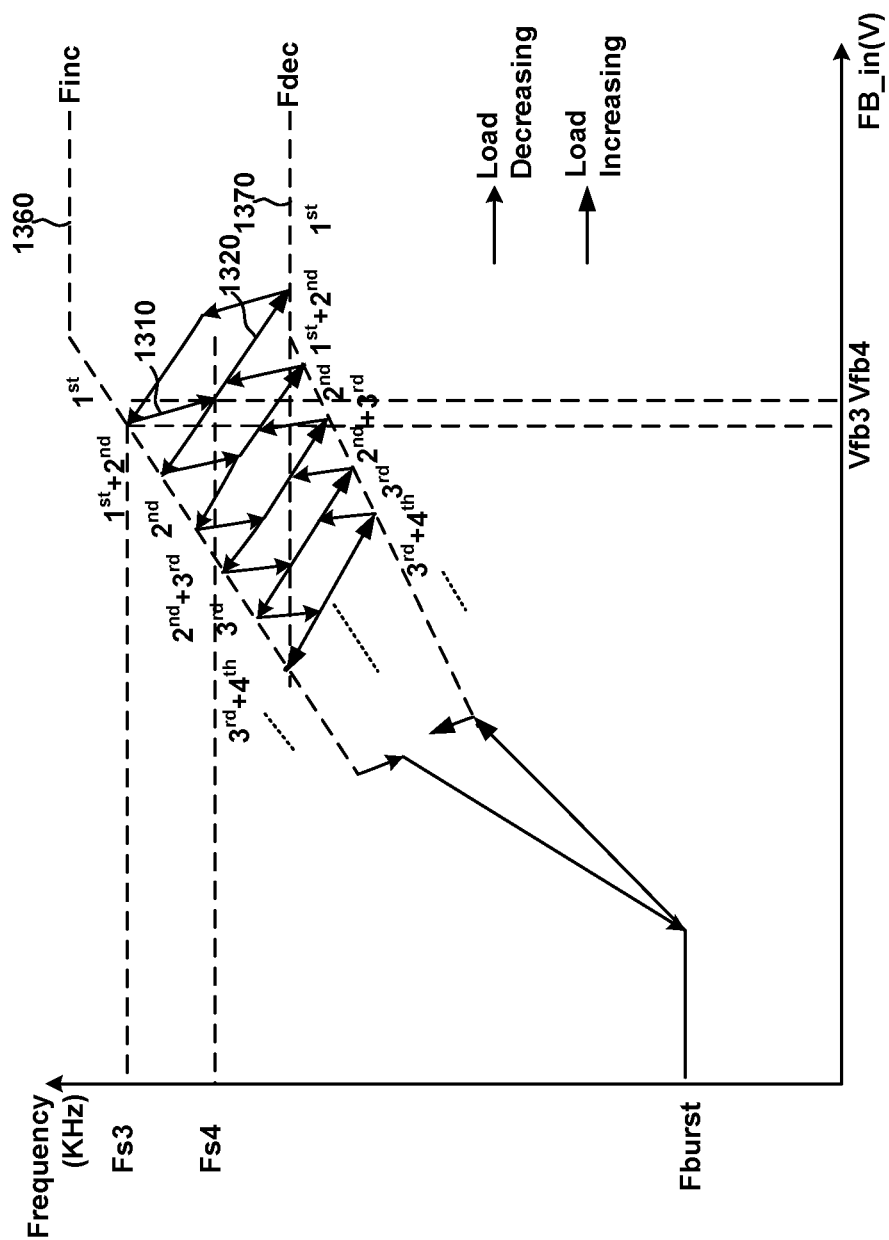
FIG. 13 shows a simplified diagram for the quasi-resonant switching power supply with a valley locking mechanism as shown in FIG. 7 according to certain embodiments of the present invention.

FIG. 13 shows a simplified diagram for the quasi-resonant switching power supply 700 with a valley locking mechanism as shown in FIG. 7 according to certain embodiments of the present invention. This diagram is merely an example, which should not unduly limit the scope of the claims. One of ordinary skill in the art would recognize many variations, alternatives, and modifications. The waveform 1310 represents the switching frequency of the drive signal 752 as a function of the signal 773 (e.g., $V_{FB\_in}$) when the output current 794 decreases as the output voltage 792 remains constant, and the waveform 1320 represents the switching frequency of the drive signal 752 as a function of the signal 773 (e.g., $V_{FB\_in}$) when the output current 794 increases as the output voltage 792 remains constant.

As shown in FIG. 13, the operation frequency of the quasi-resonant switching power supply 700, which is equal to the switching frequency of the drive signal 752, needs to fall within a predetermined range between an upper frequency limit (e.g., $F_{inc}$) and a lower frequency limit (e.g., $F_{dec}$) according to some embodiments. For example, the waveform 1360 represents the upper frequency limit (e.g., $F_{inc}$) as a function of the signal 773 (e.g., $V_{FB\_in}$). As an example, the waveform 1370 represents the lower frequency limit (e.g., $F_{dec}$) as a function of the signal 773 (e.g., $V_{FB\_in}$).

In certain embodiments, when the output current 794 decreases as the output voltage 792 remains constant (e.g., when the output load of the quasi-resonant switching power supply 700 changes from high load to light load), the magnitude of the signal 773 (e.g., $V_{FB\_in}$), the on-time period of a switching cycle, and the demagnetization time of a demagnetization process also decrease. In some examples, as shown by the waveform 1310, if the quasi-resonant switching power supply 700 operates in a same valley-locking mode (e.g., a valley-locking mode in which a switching cycle starts at the $1^{st}$ valley or the $2^{nd}$ valley), the switching frequency of the drive signal 752 increases, when the output current 794 decreases as the output voltage 792 remains constant (e.g., when the output load of the quasi-resonant switching power supply 700 changes from high load to light load). For example, when the switching frequency of the drive signal 752 increases to the corresponding upper frequency limit (e.g., $F_{inc}$) as shown by the waveform 1360, the quasi-resonant switching power supply 700 changes from one valley-locking mode to another valley-locking mode (e.g., changes from a valley-locking mode in which a switching cycle starts at the $1^{st}$ valley or the $2^{nd}$ valley to another valley-locking mode in which a switching cycle starts at only the $2^{nd}$ valley). As an example, when the quasi-resonant switching power supply 700 changes from a valley-locking mode to another valley-locking mode (e.g., changes from a valley-locking mode in which a switching cycle starts at the $1^{st}$ valley or the $2^{nd}$ valley to another valley-locking mode in which a switching cycle starts at only the $2^{nd}$ valley), the switching frequency of the drive signal 752 drops to a frequency magnitude within the predetermined range between the upper frequency limit (e.g., $F_{inc}$) and the lower frequency limit (e.g., $F_{dec}$), but the signal 773 (e.g., $V_{FB\_in}$) becomes larger.

In certain examples, as shown by the waveform 1310, when the signal 773 (e.g., $V_{FB\_in}$) is equal to a voltage magnitude $V_{fb3}$, the switching frequency of the drive signal 752 reaches the corresponding upper frequency limit (e.g., $F_{inc}$) that is equal to a frequency magnitude $F_{s3}$, and the valley of the voltage difference from the drain terminal 722 to the source terminal 726 at which a switching cycle starts is changed from the $1^{st}$ valley for all switching cycles to the $1^{st}$ valley for some switching cycles and the $2^{nd}$ valley for other switching cycles. For example, when the valley of the voltage difference from the drain terminal 722 to the source terminal 726 at which a switching cycle starts is changed from the $1^{st}$ valley for all switching cycles to the $1^{st}$ valley for some switching cycles and the $2^{nd}$ valley for other switching cycles, the switching frequency of the drive signal 752 drops from the frequency magnitude $F_{s3}$ to another frequency magnitude $F_{s4}$ and the signal 773 (e.g., $V_{FB\_in}$) increases from the voltage magnitude $V_{fb3}$ to another voltage magnitude $V_{fb4}$. As an example, $F_{s3}$-$F_{s4}$ is smaller than $F_{s1}$-$F_{s2}$, and $V_{fb4}$-$V_{fb3}$ is smaller than $V_{fb2}$-$V_{fb1}$. For example, without taking into account any adjustment made through feedback by the quasi-resonant switching power supply 700, $F_{s3}$-$F_{s4}$ is equal to $A=(F_{s3}+F_{s4})/2$. As an example, by making $V_{fb4}$-$V_{fb3}$ smaller than $V_{fb2}$-$V_{fb1}$, the stability of valley locking and the stability of feedback loop both are improved.

In some examples, the quasi-resonant switching power supply 700 operates in a valley-locking mode in which, within an envelope period (e.g., an envelope period that corresponds to an envelope frequency higher than 20 KHz), for half of all switching cycles, a switching cycle starts at the $1^{st}$ valley, and for the other half of all switching cycles, a switching cycle starts at the $2^{nd}$ valley. For example, for this valley-locking mode, the average switching frequency is equal to $(F_{s3}+F_{s4})/2$.

In some embodiments, when the output current 794 increases as the output voltage 792 remains constant (e.g., when the output load of the quasi-resonant switching power supply 700 changes from low load to high load), the magnitude of the signal 773 (e.g., $V_{FB\_in}$), the on-time period of a switching cycle, and the demagnetization time of a demagnetization process also increase. In certain examples, as shown by the waveform 1320, if the quasi-resonant switching power supply 700 operates in a same valley-locking mode (e.g., a valley-locking mode in which a switching cycle starts at the $1^{st}$ valley or the $2^{nd}$ valley), the switching frequency of the drive signal 352 decreases, when the output current 794 increases as the output voltage 792 remains constant (e.g., when the output load of the quasi-resonant switching power supply 700 changes from light load to high load). For example, when the switching frequency of the drive signal 752 decreases to the corresponding lower frequency limit (e.g., $F_{dec}$) as shown by the waveform 1370, the quasi-resonant switching power supply 700 changes from one valley-locking mode to another valley-locking mode (e.g., changes from a valley-locking mode in which a switching cycle starts at the $1^{st}$ valley or the $2^{nd}$ valley to another valley-locking mode in which a switching cycle starts at only the $1^{st}$ valley). As an example, when the quasi-resonant switching power supply 700 changes from a valley-locking mode to another valley-locking mode (e.g., changes from a valley-locking mode in which a switching cycle starts at the $1^{st}$ valley or the $2^{nd}$ valley to another valley-locking mode in which a switching cycle starts at only the $1^{st}$ valley), the switching frequency of the drive signal 752 jumps to a higher frequency magnitude that falls within the predetermined range between the upper frequency limit (e.g., $F_{inc}$) and the lower frequency limit (e.g., $F_{dec}$), but the signal 773 (e.g., $V_{FB\_in}$) becomes smaller.

In some examples, as shown by the waveform 1320, as an example, if the switching frequency of the drive signal 352 reaches the corresponding lower frequency limit (e.g., $F_{dec}$), the valley of the voltage difference from the drain terminal 322 to the source terminal 326 at which a switching cycle starts is changed from the $1^{st}$ valley for some switching cycles and the $2^{nd}$ valley for other switching cycles to the $1^{st}$ valley for all switching cycles. For example, when the valley of the voltage difference from the drain terminal 722 to the source terminal 726 at which a switching cycle starts is changed from the $1^{st}$ valley for some switching cycles and the $2^{nd}$ valley for other switching cycles to the $1^{st}$ valley for all switching cycles, the switching frequency of the drive signal 752 jumps higher and the signal 773 (e.g., $V_{FB\_in}$) becomes smaller.

Figure 14:
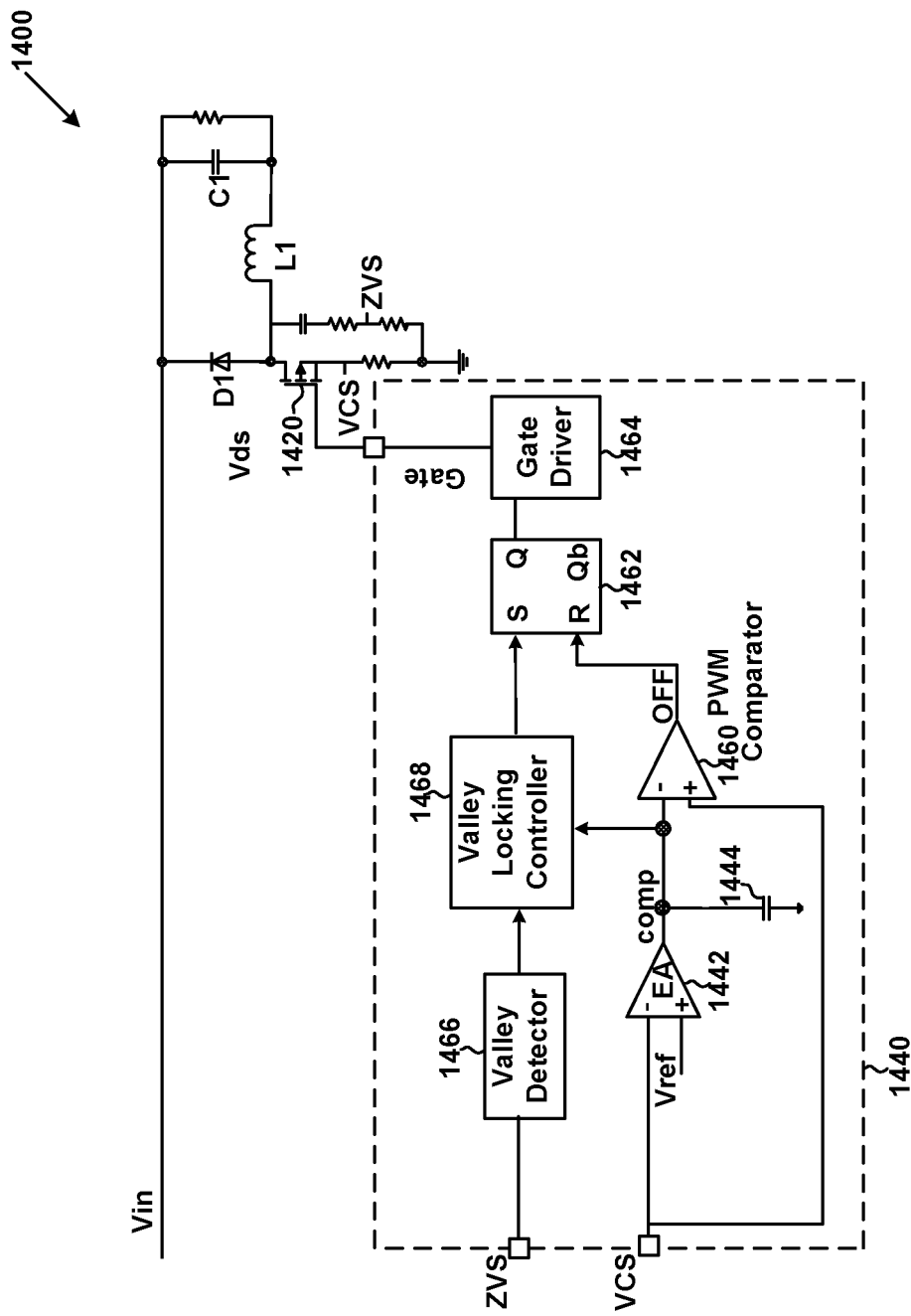
FIG. 14 is a simplified diagram showing a quasi-resonant switching power supply with a valley locking mechanism according to some embodiments of the present invention.

As discussed above and further emphasized here, FIG. 7 is merely an example, which should not unduly limit the scope of the claims. One of ordinary skill in the art would recognize many variations, alternatives, and modifications. For example, the quasi-resonant switching power supply 700 is implemented according to a flyback architecture as shown in FIG. 7, but a quasi-resonant switching power supply 700 can also be implemented according to a buck architecture as shown in FIG. 14. As an example, the quasi-resonant switching power supply 700 is implemented according to a flyback architecture as shown in FIG. 7, but a quasi-resonant switching power supply 700 can also be implemented according to a boost architecture as shown in FIG. 15.

FIG. 14 is a simplified diagram showing a quasi-resonant switching power supply with a valley locking mechanism according to some embodiments of the present invention. This diagram is merely an example, which should not unduly limit the scope of the claims. One of ordinary skill in the art would recognize many variations, alternatives, and modifications. For example, the quasi-resonant switching power supply 1400 is implemented according to a buck architecture. As an example, the quasi-resonant switching power supply 1400 includes a quasi-resonant controller 1440 and a transistor 1420. Although the above has been shown using a selected group of components for the quasi-resonant switching power supply 1400, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 14, the quasi-resonant controller 1440 includes a comparator 1460, a flip-flop 1462, a gate driver 1464, a valley detector 1466, a valley locking controller 1468, an error amplifier 1442, and a capacitor 1444 according to certain embodiments. In some examples, the valley locking controller 1468 selects the $n^{th}$ valley to start each of some switching cycles and selects the $(n+1)^{th}$ valley to start each of other switching cycles, where n is a positive integer (e.g., n being equal to 1). For example, the valley of the voltage difference from the drain terminal of the transistor 1420 to the source terminal of the transistor 1420 at which a switching cycle starts alternates between the $n^{th}$ valley and the $(n+1)^{th}$ valley, where n is the positive integer. As an example, the valley of the voltage difference from the drain terminal to the source terminal of the transistor 1420 at which a switching cycle starts is locked at the $n^{th}$ valley, and the valley of the voltage difference from the drain terminal to the source terminal of the transistor 1420 at which another switching cycle starts is locked at the $(n+1)^{th}$ valley, where the another switching cycle immediately follows the switching cycle, with n being the positive integer.

Figure 15:
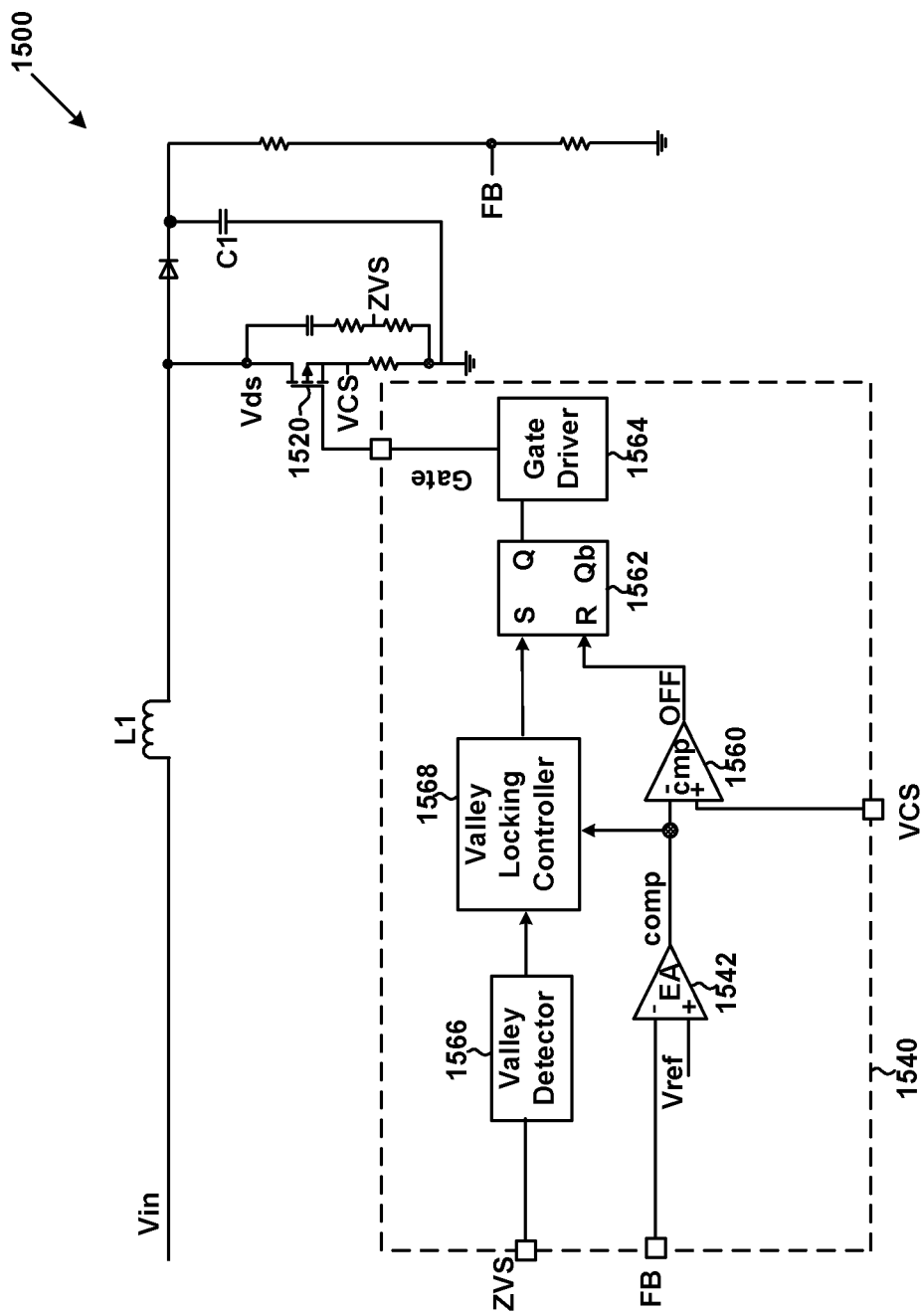
FIG. 15 is a simplified diagram showing a quasi-resonant switching power supply with a valley locking mechanism according to certain embodiments of the present invention.

FIG. 15 is a simplified diagram showing a quasi-resonant switching power supply with a valley locking mechanism according to certain embodiments of the present invention. This diagram is merely an example, which should not unduly limit the scope of the claims. One of ordinary skill in the art would recognize many variations, alternatives, and modifications. For example, the quasi-resonant switching power supply 1500 is implemented according to a boost architecture. As an example, the quasi-resonant switching power supply 1500 includes a quasi-resonant controller 1540 and a transistor 1520. Although the above has been shown using a selected group of components for the quasi-resonant switching power supply 1500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 15, the quasi-resonant controller 1540 includes a comparator 1560, a flip-flop 1562, a gate driver 1564, a valley detector 1566, a valley locking controller 1568, and an error amplifier 1542 according to some embodiments. In some examples, the valley locking controller 1568 selects the $n^{th}$ valley to start each of some switching cycles and selects the $(n+1)^{th}$ valley to start each of other switching cycles, where n is a positive integer (e.g., n being equal to 1). For example, the valley of the voltage difference from the drain terminal of the transistor 1520 to the source terminal of the transistor 1520 at which a switching cycle starts alternates between the $n^{th}$ valley and the $(n+1)^{th}$ valley, where n is the positive integer. As an example, the valley of the voltage difference from the drain terminal to the source terminal of the transistor 1520 at which a switching cycle starts is locked at the $n^{th}$ valley, and the valley of the voltage difference from the drain terminal to the source terminal of the transistor 1520 at which another switching cycle starts is locked at the $(n+1)^{th}$ valley, where the another switching cycle immediately follows the switching cycle, with n being the positive integer.

Figure 16:
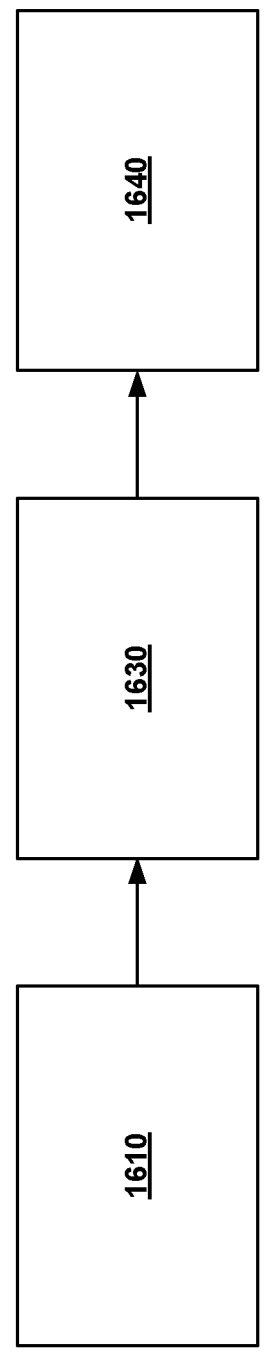
FIG. 16 is a simplified diagram showing certain components of the valley locking component of the quasi-resonant controller as part of the quasi-resonant switching power supply according to some embodiments of the present invention.

FIG. 16 is a simplified diagram showing certain components of the valley locking controller 768 of the quasi-resonant controller 740 as part of the quasi-resonant switching power supply 700 according to some embodiments of the present invention. This diagram is merely an example, which should not unduly limit the scope of the claims. One of ordinary skill in the art would recognize many variations, alternatives, and modifications. The valley locking controller 768 includes a mode controller 1610 for valley selection, a mode encoder 1630, and a valley-selection component 1640. As an example, the mode controller 1610 for valley selection includes the mode controller 910 for valley selection, the mode encoder 1630 includes the mode encoder 930, and the valley-selection component 1640 includes the valley counter 940, the valley-skipping controller 950, the AND gate 960, and the valley selection controller 970. Although the above has been shown using a selected group of components for the valley locking controller 768, there can be many alternatives, modifications, and variations. For example, some of the components may be expanded and/or combined. Other components may be inserted to those noted above. Depending upon the embodiment, the arrangement of components may be interchanged with others replaced. As an example, the mode controller 1510 for valley selection is removed from the valley locking controller 768. Further details of these components are found throughout the present specification.

Figure 17:
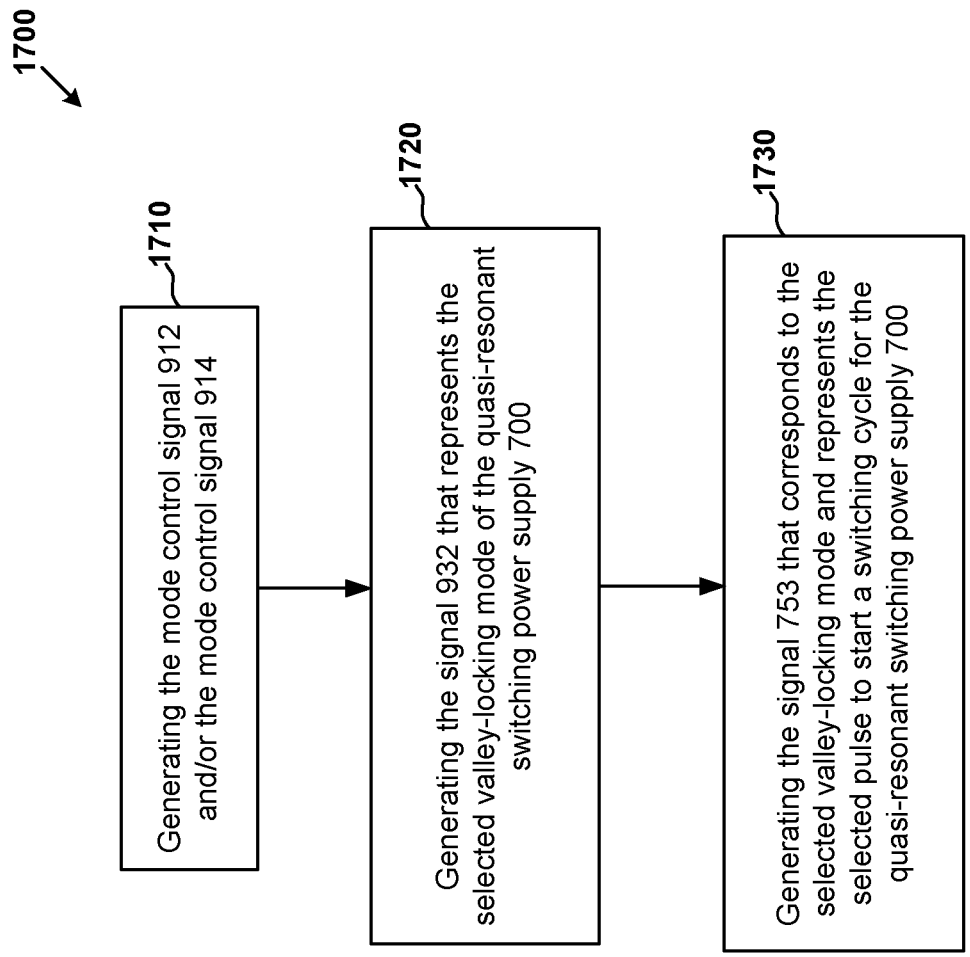
FIG. 17 is a simplified diagram showing a method for the valley locking component of the quasi-resonant controller as part of the quasi-resonant switching power supply as shown in FIG. 7 according to certain embodiments of the present invention.

FIG. 17 is a simplified diagram showing a method for the valley locking controller 768 of the quasi-resonant controller 740 as part of the quasi-resonant switching power supply 700 as shown in FIG. 7 according to certain embodiments of the present invention. This diagram is merely an example, which should not unduly limit the scope of the claims. One of ordinary skill in the art would recognize many variations, alternatives, and modifications. The method 1700 includes a process 1710 for generating the mode control signal 912 and/or the mode control signal 914, wherein the mode control signal 912 represents increasing the valley-locking mode number by one (e.g., from the $p^{th}$ mode to the $(p+1)^{th}$ mode, where p is a positive integer), and the mode control signal 914 represents decreasing the valley-locking mode number by one (e.g., from the $q^{th}$ mode to the $(q-1)^{th}$ mode, where q is an integer larger than 1). Additionally, the method 1700 includes a process 1720 for generating the mode control signal 932 that represents the selected valley-locking mode of the quasi-resonant switching power supply 700 based at least in part on the mode control signal 912 and/or the mode control signal 914. Moreover, the method 1700 includes a process 1730 for generating the signal 753 that corresponds to the selected valley-locking mode and represents the selected pulse to start a switching cycle for the quasi-resonant switching power supply 700. Although the above has been shown using a selected group of processes for the method 1700, there can be many alternatives, modifications, and variations. For example, some of the processes may be expanded and/or combined. Other processes may be inserted to those noted above. Depending upon the embodiment, the sequence of processes may be interchanged with others replaced. As an example, the process 1710 for generating the mode control signal 912 and/or the mode control signal 914 is removed from the method 1700. Further details of these processes are found throughout the present specification.

According to some embodiments, the quasi-resonant switching power supply 700 cannot change directly from a mode in which a switching cycle starts at the $n^{th}$ valley for all switching cycles to a mode in which a switching cycle starts at the $(n+1)^{th}$ valley for all switching cycles, where n is a positive integer. In certain examples, the quasi-resonant switching power supply 700 changes indirectly from a mode in which a switching cycle starts at the $n^{th}$ valley for all switching cycles to a mode in which a switching cycle starts at the $(n+1)^{th}$ valley for all switching cycles, through one or more intermediate modes (e.g., a mode in which a switching cycle starts at the $n^{th}$ valley for some switching cycles and at the $(n+1)^{th}$ valley for other switching cycles), where n is a positive integer. For example, the quasi-resonant switching power supply 700 changes from a mode in which a switching cycle starts at the $n^{th}$ valley for all switching cycles to a mode in which a switching cycle starts at the $n^{th}$ valley for some switching cycles and at the $(n+1)^{th}$ valley for other switching cycles, where n is a positive integer. As an example, the quasi-resonant switching power supply 700 changes from a mode in which a switching cycle starts at the $n^{th}$ valley for some switching cycles and at the $(n+1)^{th}$ valley for other switching cycles to a mode in which a switching cycle starts at the $(n+1)^{th}$ valley for all switching cycles, where n is a positive integer.

According to certain embodiments, the quasi-resonant switching power supply 700 cannot change directly from a mode in which a switching cycle starts at the $(n+1)^{th}$ valley for all switching cycles to a mode in which a switching cycle starts at the $n^{th}$ valley for all switching cycles, where n is a positive integer. In some examples, the quasi-resonant switching power supply 700 changes indirectly from a mode in which a switching cycle starts at the $(n+1)^{th}$ valley for all switching cycles to a mode in which a switching cycle starts at the $n^{th}$ valley for all switching cycles, through one or more intermediate modes (e.g., a mode in which a switching cycle starts at the $n^{th}$ valley for some switching cycles and at the $(n+1)^{th}$ valley for other switching cycles), where n is a positive integer. For example, the quasi-resonant switching power supply 700 changes from a mode in which a switching cycle starts at the $(n+1)^{th}$ valley for all switching cycles to a mode in which a switching cycle starts at the $n^{th}$ valley for some switching cycles and at the $(n+1)^{th}$ valley for other switching cycles, where n is a positive integer. As an example, the quasi-resonant switching power supply 700 changes from a mode in which a switching cycle starts at the $n^{th}$ valley for some switching cycles and at the $(n+1)^{th}$ valley for other switching cycles to a mode in which a switching cycle starts at the $n^{th}$ valley for all switching cycles, where n is a positive integer.

In some embodiments, a controller for a quasi-resonant switching power supply includes: a valley detector configured to receive a voltage signal, detect one or more voltage valleys of the voltage signal in magnitude, and generate a detection signal representing the detected one or more voltage valleys; a valley-locking controller configured to receive one or more signals, generate a mode control signal that indicates a selected valley-locking mode based at least in part on the one or more signals, select from the detected one or more voltage valleys, one or more valleys that correspond to the selected valley-locking mode, and generate a valley control signal indicating the one or more selected valleys; and a gate driver configured to generate a drive signal based on at least information associated with the valley control signal and change the drive signal from a first logic level to a second logic level to start multiple switching cycles in response to the one or more selected valleys; wherein, in the selected valley-locking mode, the valley-locking controller is further configured to select one or more $n^{th}$ valleys of the voltage signal and one or more $(n+1)^{th}$ valleys of the voltage signal as the one or more selected valleys, n being a positive integer; and the gate driver is further configured to: start one or more first switching cycles of the multiple switching cycles at the one or more $n^{th}$ valleys of the voltage signal respectively; and start one or more second switching cycles of the multiple switching cycles at the one or more $(n+1)^{th}$ valleys of the voltage signal respectively. For example, the controller is implemented according to at least FIG. 7 and/or FIG. 9.

As an example, one first switching cycle of the one or more first switching cycles that starts at an $n^{th}$ valley of the voltage signal is followed immediately by one second switching cycle of the one or more second switching cycles that starts at an $(n+1)^{th}$ valley of the voltage signal. For example, the one second switching cycle of the one or more second switching cycles that starts at the $(n+1)^{th}$ valley of the voltage signal is followed immediately by another first switching cycle of the one or more first switching cycles that starts at another $n^{th}$ valley of the voltage signal. As an example, the another first switching cycle of the one or more first switching cycles that starts at the another $n^{th}$ valley of the voltage signal is followed immediately by another second switching cycle of the one or more second switching cycles that starts at another $(n+1)^{th}$ valley of the voltage signal.

For example, one second switching cycle of the one or more second switching cycles that starts at an $(n+1)^{th}$ valley of the voltage signal is followed immediately by one first switching cycle of the one or more first switching cycles that starts at an $n^{th}$ valley of the voltage signal. As an example, the one first switching cycle of the one or more first switching cycles that starts at the $n^{th}$ valley of the voltage signal is followed immediately by another second switching cycle of the one or more second switching cycles that starts at another $(n+1)^{th}$ valley of the voltage signal. For example, the another second switching cycle of the one or more second switching cycles that starts at the another $(n+1)^{th}$ valley of the voltage signal is followed immediately by another first switching cycle of the one or more first switching cycles that starts at another $n^{th}$ valley of the voltage signal.

As an example, the valley-locking controller is further configured to change the mode control signal from indicating a first valley-locking mode to indicating the selected valley-locking mode, based at least in part on the one or more signals; and in the first valley-locking mode, the gate driver is further configured to start all multiple switching cycles at multiple $n^{th}$ valleys of the voltage signal respectively. For example, the valley-locking controller is further configured to change the mode control signal from indicating the selected valley-locking mode to indicating a second valley-locking mode, based at least in part on the one or more signals; and in the second valley-locking mode, the gate driver is further configured to start all switching cycles at multiple $(n+1)^{th}$ valleys of the voltage signal respectively.

As an example, the valley-locking controller is further configured to change the mode control signal from indicating a first valley-locking mode to indicating the selected valley-locking mode, based at least in part on the one or more signals; and in the first valley-locking mode, the gate driver is further configured to start all multiple switching cycles at multiple $(n+1)^{th}$ valleys of the voltage signal respectively. For example, the valley-locking controller is further configured to change the mode control signal from indicating the selected valley-locking mode to indicating a second valley-locking mode, based at least in part on the one or more signals; and in the second valley-locking mode, the gate driver is further configured to start all switching cycles at multiple $n^{th}$ valleys of the voltage signal respectively.

As an example, the valley-locking controller is further configured to not to allow the mode control signal to change directly from indicating a first valley-locking mode to indicating a second valley-locking mode; in the first valley-locking mode, the gate driver is further configured to start all multiple switching cycles at multiple $n^{th}$ valleys of the voltage signal respectively; and in the second valley-locking mode, the gate driver is further configured to start all multiple switching cycles at multiple $(n+1)^{th}$ valleys of the voltage signal respectively. For example, the valley-locking controller is further configured to not to allow the mode control signal to change directly from indicating a first valley-locking mode to indicating a second valley-locking mode; in the first valley-locking mode, the gate driver is further configured to start all multiple switching cycles at multiple $(n+1)^{th}$ valleys of the voltage signal respectively; and in the second valley-locking mode, the gate driver is further configured to start all multiple switching cycles at multiple $n^{th}$ valleys of the voltage signal respectively.

As an example, the valley detector is further configured to receive the voltage signal from a voltage divider connected to an auxiliary winding coupled to a primary winding and a secondary winding. For example, the gate driver is further configured to output the drive signal to a transistor connected to the primary winding. As an example, the gate driver is further configured to change the drive signal from the first logic level to the second logic level to turn on the transistor. For example, the first logic level is a logic low level; and the second logic level is a logic high level.

As an example, the one or more signals include a feedback signal representing an output voltage of the quasi-resonant switching power supply. For example, the one or more signals include the drive signal. As an example, the one or more signals further include a feedback signal representing an output voltage of the quasi-resonant switching power supply. For example, the mode control signal represents an m-digit binary number that indicates the selected valley-locking mode.

In certain embodiments, a method for a quasi-resonant switching power supply includes: receiving a voltage signal; detecting one or more voltage valleys of the voltage signal in magnitude; generating a detection signal representing the detected one or more voltage valleys; receiving one or more signals; generating a mode control signal that indicates a selected valley-locking mode based at least in part on the one or more signals; selecting from the detected one or more voltage valleys, one or more valleys that correspond to the selected valley-locking mode; generating a valley control signal indicating the one or more selected valleys; processing information associated with the valley control signal; generating a drive signal based on at least information associated with the valley control signal; and changing the drive signal from a first logic level to a second logic level to start multiple switching cycles in response to the one or more selected valleys; wherein, in the selected valley-locking mode, the selecting from the detected one or more voltage valleys, one or more valleys that correspond to the selected valley-locking mode includes: selecting one or more $n^{th}$ valleys of the voltage signal and one or more $(n+1)^{th}$ valleys of the voltage signal as the one or more selected valleys, n being a positive integer; wherein, in the selected valley-locking mode, the changing the drive signal from a first logic level to a second logic level to start multiple switching cycles in response to the one or more selected valleys includes: starting one or more first switching cycles of the multiple switching cycles at the one or more $n^{th}$ valleys of the voltage signal respectively; and starting one or more second switching cycles of the multiple switching cycles at the one or more $(n+1)^{th}$ valleys of the voltage signal respectively. For example, the method is implemented according to at least FIG. 7 and/or FIG. 9.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a quasi-resonant switching power supply, the controller comprising:
   a valley detector configured to receive a voltage signal, detect one or more voltage valleys of the voltage signal in magnitude, and generate a detection signal representing the detected one or more voltage valleys;
   a valley-locking controller configured to receive one or more signals, generate a mode control signal that indicates a selected valley-locking mode based at least in part on the one or more signals, select from the detected one or more voltage valleys, one or more valleys that correspond to the selected valley-locking mode, and generate a valley control signal indicating the one or more selected valleys; and
   a gate driver configured to generate a drive signal based on at least information associated with the valley control signal and change the drive signal from a first logic level to a second logic level to start multiple switching cycles in response to the one or more selected valleys;

wherein, in the selected valley-locking mode,
the valley-locking controller is further configured to select one or more $n^{th}$ valleys of the voltage signal and one or more $(n+1)^{th}$ valleys of the voltage signal as the one or more selected valleys, n being a positive integer; and
the gate driver is further configured to:
start one or more first switching cycles of the multiple switching cycles at the one or more $n^{th}$ valleys of the voltage signal respectively; and
start one or more second switching cycles of the multiple switching cycles at the one or more $(n+1)^{th}$ valleys of the voltage signal respectively.

2. The controller of claim 1 wherein one first switching cycle of the one or more first switching cycles that starts at an $n^{th}$ valley of the voltage signal is followed immediately by one second switching cycle of the one or more second switching cycles that starts at an $(n+1)^{th}$ valley of the voltage signal.

3. The controller of claim 2 wherein the one second switching cycle of the one or more second switching cycles that starts at the $(n+1)^{th}$ valley of the voltage signal is followed immediately by another first switching cycle of the one or more first switching cycles that starts at another $n^{th}$ valley of the voltage signal.

4. The controller of claim 3 wherein the another first switching cycle of the one or more first switching cycles that starts at the another $n^{th}$ valley of the voltage signal is followed immediately by another second switching cycle of the one or more second switching cycles that starts at another $(n+1)^{th}$ valley of the voltage signal.

5. The controller of claim 1 wherein one second switching cycle of the one or more second switching cycles that starts at an $(n+1)^{th}$ valley of the voltage signal is followed immediately by one first switching cycle of the one or more first switching cycles that starts at an $n^{th}$ valley of the voltage signal.

6. The controller of claim 5 wherein the one first switching cycle of the one or more first switching cycles that starts at the $n^{th}$ valley of the voltage signal is followed immediately by another second switching cycle of the one or more second switching cycles that starts at another $(n+1)^{th}$ valley of the voltage signal.

7. The controller of claim 6 wherein the another second switching cycle of the one or more second switching cycles that starts at the another $(n+1)^{th}$ valley of the voltage signal is followed immediately by another first switching cycle of the one or more first switching cycles that starts at another $n^{th}$ valley of the voltage signal.

8. The controller of claim 1 wherein:
the valley-locking controller is further configured to change the mode control signal from indicating a first valley-locking mode to indicating the selected valley-locking mode, based at least in part on the one or more signals; and
in the first valley-locking mode, the gate driver is further configured to start all multiple switching cycles at multiple $n^{th}$ valleys of the voltage signal respectively.

9. The controller of claim 8 wherein:
the valley-locking controller is further configured to change the mode control signal from indicating the selected valley-locking mode to indicating a second valley-locking mode, based at least in part on the one or more signals; and
in the second valley-locking mode, the gate driver is further configured to start all switching cycles at multiple $(n+1)^{th}$ valleys of the voltage signal respectively.

10. The controller of claim 1 wherein:
the valley-locking controller is further configured to change the mode control signal from indicating a first valley-locking mode to indicating the selected valley-locking mode, based at least in part on the one or more signals; and
in the first valley-locking mode, the gate driver is further configured to start all multiple switching cycles at multiple $(n+1)^{th}$ valleys of the voltage signal respectively.

11. The controller of claim 10 wherein:
the valley-locking controller is further configured to change the mode control signal from indicating the selected valley-locking mode to indicating a second valley-locking mode, based at least in part on the one or more signals; and
in the second valley-locking mode, the gate driver is further configured to start all switching cycles at multiple $n^{th}$ valleys of the voltage signal respectively.

12. The controller of claim 1 wherein:
the valley-locking controller is further configured to not to allow the mode control signal to change directly from indicating a first valley-locking mode to indicating a second valley-locking mode;
in the first valley-locking mode, the gate driver is further configured to start all multiple switching cycles at multiple $n^{th}$ valleys of the voltage signal respectively; and
in the second valley-locking mode, the gate driver is further configured to start all multiple switching cycles at multiple $(n+1)^{th}$ valleys of the voltage signal respectively.

13. The controller of claim 1 wherein:
the valley-locking controller is further configured to not to allow the mode control signal to change directly from indicating a first valley-locking mode to indicating a second valley-locking mode;
in the first valley-locking mode, the gate driver is further configured to start all multiple switching cycles at multiple $(n+1)^{th}$ valleys of the voltage signal respectively; and
in the second valley-locking mode, the gate driver is further configured to start all multiple switching cycles at multiple $n^{th}$ valleys of the voltage signal respectively.

14. The controller of claim 1 wherein the valley detector is further configured to receive the voltage signal from a voltage divider connected to an auxiliary winding coupled to a primary winding and a secondary winding.

15. The controller of claim 14 wherein the gate driver is further configured to output the drive signal to a transistor connected to the primary winding.

16. The controller of claim 15 wherein the gate driver is further configured to change the drive signal from the first logic level to the second logic level to turn on the transistor.

17. The controller of claim 16 wherein:
the first logic level is a logic low level; and
the second logic level is a logic high level.

18. The controller of claim 1 wherein the one or more signals include a feedback signal representing an output voltage of the quasi-resonant switching power supply.

19. The controller of claim 1 wherein the one or more signals include the drive signal.

20. The controller of claim 19 wherein the one or more signals further include a feedback signal representing an output voltage of the quasi-resonant switching power supply.

21. The controller of claim 1 wherein the mode control signal represents an m-digit binary number that indicates the selected valley-locking mode.

22. A method for a quasi-resonant switching power supply, the method comprising:
- receiving a voltage signal;
- detecting one or more voltage valleys of the voltage signal in magnitude;
- generating a detection signal representing the detected one or more voltage valleys;
- receiving one or more signals;
- generating a mode control signal that indicates a selected valley-locking mode based at least in part on the one or more signals;
- selecting from the detected one or more voltage valleys, one or more valleys that correspond to the selected valley-locking mode;
- generating a valley control signal indicating the one or more selected valleys;
- processing information associated with the valley control signal;
- generating a drive signal based on at least information associated with the valley control signal; and
- changing the drive signal from a first logic level to a second logic level to start multiple switching cycles in response to the one or more selected valleys;

wherein, in the selected valley-locking mode, the selecting from the detected one or more voltage valleys, one or more valleys that correspond to the selected valley-locking mode includes:
- selecting one or more $n^{th}$ valleys of the voltage signal and one or more $(n+1)^{th}$ valleys of the voltage signal as the one or more selected valleys, n being a positive integer;

wherein, in the selected valley-locking mode, the changing the drive signal from a first logic level to a second logic level to start multiple switching cycles in response to the one or more selected valleys includes:
- starting one or more first switching cycles of the multiple switching cycles at the one or more $n^{th}$ valleys of the voltage signal respectively; and
- starting one or more second switching cycles of the multiple switching cycles at the one or more $(n+1)^{th}$ valleys of the voltage signal respectively.

* * * * *